(12) United States Patent
Nemoto et al.

(10) Patent No.: US 7,541,710 B2
(45) Date of Patent: Jun. 2, 2009

(54) ROTATING ELECTRIC MACHINE

(75) Inventors: Kanako Nemoto, Tsuchiura (JP);
Yasushi Takano, Kasumigaura (JP);
Kazuhiko Takahashi, Hitachi (JP);
Kazuo Shima, Nonoichi (JP); Kazuo Nishihama, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 170 days.

(21) Appl. No.: 11/289,515

(22) Filed: Nov. 30, 2005

(65) Prior Publication Data
US 2006/0163969 A1    Jul. 27, 2006

(30) Foreign Application Priority Data
Jan. 21, 2005    (JP)    ............... 2005-013480

(51) Int. Cl.
*H02K 1/22*    (2006.01)
*H02K 1/26*    (2006.01)
*H02K 17/12*    (2006.01)

(52) U.S. Cl. ............... 310/156.47; 310/156.45

(58) Field of Classification Search ............ 310/156.25, 310/156.38, 156.43–156.48, 49 R
See application file for complete search history.

(56) References Cited

U.S. PATENT DOCUMENTS

| | | | | | |
|---|---|---|---|---|---|
| 5,355,044 | A | * | 10/1994 | Uchida et al. | ............... 310/162 |
| 5,760,503 | A | * | 6/1998 | Tsuchida et al. | ........... 310/49 R |
| 6,707,209 | B2 | * | 3/2004 | Crapo et al. | ........... 310/156.43 |
| 7,067,948 | B2 | * | 6/2006 | Yamaguchi et al. | .... 310/156.47 |
| 2002/0140308 | A1 | | 10/2002 | Inayama et al. | |
| 2004/0245880 | A1 | * | 12/2004 | Liang | .............. 310/156.47 |
| 2007/0205689 | A1 | * | 9/2007 | Nemoto et al. | ......... 310/156.47 |

FOREIGN PATENT DOCUMENTS

| | | |
|---|---|---|
| CN | 85 2 05739 U | 10/1986 |
| EP | EP 1 501 172 A2 | 1/2005 |
| JP | 7-163108 A | 6/1995 |
| JP | 7-298578 A | 11/1995 |
| JP | 8-298735 A | 11/1996 |

(Continued)

OTHER PUBLICATIONS

European Search Report dated Feb. 24, 2006. (Eight (8) pages).

(Continued)

*Primary Examiner*—Tran N Nguyen
(74) *Attorney, Agent, or Firm*—Crowell & Moring LLP

(57) ABSTRACT

Provided is a rotating electric machine which can restrain vibration and noise induced by a radial electromagnetic force of the rotating electric machine, and in which a rotor is divided into first to fourth four rotating pieces having axial lengths of 0.29L, 0.71L, 0.71L and 0.29L where 2L is an axial length of a rotor or stator core, and secondary conductors defining effective magnetic pole opening angles, are arranged being shifted by a value which is equal to a phase difference of electric angle between axial sections of the rotor pieces in order to define skews so that phase differences of electric angles are continuous between axial sections of the first and second rotor pieces, the skews being continuous between the third and fourth rotor pieces but being not continuous between the second and third rotor pieces arranged being shifted by a value which is equal to a phase difference of electric angle between axial sections of the rotor.

4 Claims, 19 Drawing Sheets

FOREIGN PATENT DOCUMENTS

| | | | | |
|---|---|---|---|---|
| JP | 10080079 | A | * | 3/1998 |
| JP | 2001359266 | A | * | 12/2001 |
| JP | 2003032939 | A | * | 1/2003 |
| JP | 2003-333811 | A | | 11/2003 |
| JP | 2004096961 | A | * | 3/2004 |
| JP | 2004-357405 | A | | 12/2004 |
| WO | WO 2004107529 | A1 | * | 12/2004 |

OTHER PUBLICATIONS

Chinese Office Action including English translation Jul. 25, 2008 (Six (6) pages).

* cited by examiner

| STATOR CORE AXIAL MODE | 0-ORDER | 1-ORDER | 2-ORDER |
|---|---|---|---|
| |  |  |  |
| ORTHOGONAL CONDITION OF ELECTRO-MAGNETIC EXCITING FORCE AND VIBRATION MODE | RESULTANT: $F = \int_L f(x)dx = 0$ | EVEN FUNCTION: $f(-x) = f(x)$ <br> MOMENT: $M_1 = \int_{-L}^{L} x f(x)dx = 0$ | ODD FUNCTION: $f(-x) = -f(x)$ <br> MOMENT: $M_2 = 2\int_{\frac{L}{2}}^{L}(x-\frac{L}{2})f(x)dx = 0$ |

| STATOR CORE AXIAL MODE | 0-ORDER x=0, 2L | 1-ORDER x=0 | 2-ORDER x=0, $x=-\frac{L}{2}$, $x=\frac{L}{2}$ |
|---|---|---|---|
| ORTHOGONAL CONDITION OF ELECTRO-MAGNETIC EXCITING FORCE AND VIBRATION MODE | RESULTANT: $F = \int_{L}^{L} f(x)dx = 0$ | EVEN FUNCTION: $f(-x) = f(x)$ MOMENT: $M_1 = \int_{L}^{L} xf(x)dx = 0$ | ODD FUNCTION: $f(-x) = -f(x)$ MOMENT: $M_2 = 2\int_{0}^{L}(x-\frac{L}{2})f(x)dx = 0$ |

| | SKEW CONFIGURATION |
|---|---|
| NO SKEW |  |
| STRAIGHT SKEW |  |
| V-LIKE SKEW |  |
| W-LIKE SKEW |  |
| BOLT LIGHTENING SKEW |  |
| λ-LIKE SKEW |  |
| SIX-DIVISION OPTIMUM SKEW |  |

ROTATING ELECTRIC MACHINE

BACKGROUND OF THE INVENTION

The present invention relates to a rotating electric machine such as an induction motor or a generator, which can restrains electromagnetic vibration and noise caused by a radial exciting force induced therein.

RELATED ART

A large number of rotating electric machines have been used in electric appliances, various OA equipments and the like, and these years, have been becoming more and more installed in electric vehicles. However, rotating electric machines installed in electric vehicles have to have a high output power, and accordingly, cause problems of vibration and nose excited by an electromagnetic exciting force induced by such a high output power.

It has been found that a magnetic path for field magnetic flux induced from magnetic poles of a rotor on moving relative to a stator periodically varies each time when a magnetic pole of the rotor runs across an opening of a slot formed in the stator, and accordingly a magnetic-flux distribution is changed at the gap, and accordingly, the above-mentioned radial magnetic exciting force of the rotating electric machine is induced.

An order of revolution, an order of space and an amplitude of the radial magnetic exciting force depend upon a number of poles in an effective magnetic pole opening angle of the rotor, a number of slots formed in the rotor and a number of slots formed in the stator. Meanwhile, it is extremely desirable to reduce vibration and noise in view of pursuit inquiry of comfortability and satisfactory atmosphere in the passenger compartment of an electric vehicle.

As one of technologies for reducing vibration and noise, there has been being provided a skew in a rotor or a stator of a rotary machine, as disclosed in documents 1 to 6 as stated below.

The document 1, JP-A-2003-333811 disclose an inner rotor type induction motor in which a plurality of ring-like coils are respectively wound on a plurality of segments obtained by axially dividing a stator, the center of each of the ring-like coils and the center of the rotor shaft are set to be coincident with each other while the stator cores constituting respective magnetic circuits are arranged on the outer peripheral sides and axially opposite ends of the coils, and magnetic pole teeth are alternately formed in the inner peripheral side of the stator cores, the coils being interposed between the magnetic pole teeth, at positions which are shifted from one another by an electric angle of π in the circumferential direction of the rotary shaft while the magnetic pole teeth of the coils are superposed with one another in the axial direction, being shifted from one other by a predetermined angle in the circumferential direction of the rotary shaft.

The document 2, JP-A-07-298578, discloses such a configuration that a stator is composed of axially divided stator segments each of which is axially shifted by a shift angle β from another stator segment.

The document 3, JP-A-07-163108 discloses an induction motor in which secondary conductors are cast in closed slots formed in a rotor so as to form squirrel cage windings, and in which a first core part having slots with a wide closed slot structure is formed in the axial center part of a core of the rotor while a second and a third core part having slots with a narrow closed slot structure are provided on opposite sides of the first core part, and the slot having the wide closed slot structure of the first core part is communicated with slots having the narrow closed slot structure in the second and third core parts, which are overlapped with each other, in order to short-circuit the secondary conductors in the axially center part of the rotor core.

The document 4, Japanese Patent No. 2,854,664, discloses a squirrel cage rotor in which steel plates formed therein punched-out parts defining slots for accommodating conductors are stacked one upon another while the punched-out parts are asymmetrically formed so that their outer peripheral bridge parts or openings being shifted from the center lines of main parts for accommodating the conductors by a distance d which satisfies the following formula:

$$\frac{\pi D}{4(z+p)} \le d \le \frac{\pi D}{4(z-p)} \qquad (1)$$

where D is a rotor diameter, z is a number of slots, and p is a pole logarithm, and the stacked core is composed of a plurality of unit blocks each composed of steel plates which are stacked one upon another in combination so that the directions of slots are coincident with one another, but the directions of slots are different from one another among unit blocks while their main parts are overlapped with each other, at least one of the stacked cores is skewed by a predetermined degree.

The document 5, JP-A-08-298735, discloses a rotor incorporating a cylindrical permanent magnet which is axially divided into permanent magnet segments adjacent those of which have skews whose directions are reversed from each other, each cylindrical permanent magnet segment being provided with one slot pitch skew, so as to have a W-like skew. Alternately, the rotor has a cylindrical permanent magnet axially divided into permanent magnet segments which are provided with one pitch skew in one and the same direction and adjacent those of which have skew lines are shifted from one another by one slot pitch so as to have a lightening bolt type skew.

The document 6, JP-A-2004-357405, discloses a rotor which is axially divided into a plurality of rotor pieces at every pole of an effective magnetic pole opening angle, adjacent those of the rotor segments having skews which are shifted from one another by on a half slot.

However, in the document 1, although affection by a harmonic wave component of gap magnetic flux can be reduced by a skew provided to the stator or the rotor, so as to reduce vibration and noise, the axial length of a rear stator core is not optimized in view of an axial mode of the stator, and accordingly, vibration and noise caused by the radial electromagnetic force are not effectively reduced.

Also in the document 2, although vibration and noise caused by torque pulsation are effectively reduced, vibration and noise caused by the radial electromagnetic exciting force are not effectively reduced.

In the document 3, although occurrence of transverse running loss can be effectively reduced, vibration and noise caused by the radial electromagnetic exciting force are not effectively reduced.

In the document 4, although occurrence of abnormal torque and as well vibration and noise caused by the abnormal torque can be restrained, vibration and nose caused by the radial magnetic exciting force are not effectively reduced since both axial length and skew angle of each of the unit blocks are not optimized.

In also the document 5, although the cogging torque can be reduced, vibration and nose caused by the radial magnetic exciting force are not effectively reduced since the length of the permanent magnet is not optimized.

In the document 6, there has been raised a problem in which a pole of an effective magnetic pole opening angle cannot be applied to such a configuration that a plurality of slots are formed in a rotor of, such as, an induction motor at equal pitches in the circumferential direction, and it is difficult to provide skews shifted respectively by half slots at several positions as an effective magnetic pole opening angles which are formed in the slots by aluminum die-casting or the like.

SUMMARY OF THE INVENTION

The present invention is devised in view of the above-mention problems, and accordingly, an object of the present invention is to provide a rotating electric machine which can reduce vibration caused by a radial electromagnetic exciting force induced in the rotating electric machine, resulting in reduction of noise.

In order to achieve the above-mentioned object, according to the present invention, there is provided a rotating electric machine comprising a rotor and a stator having a plurality of slots, the rotor being axially divided into a plurality of rotor pieces respectively having different combinations between an axial length and an absolute value of an skew angle.

Further, in order to achieve the above-mentioned object, according to the present invention, there is provided a rotating electric machine comprising a rotor and a stator having a plurality of slots, the stator being axially divided into a plurality of stator pieces segments respectively having different combination between an axial length and an absolute value of a skew angle.

Further, in order to achieve the above-mentioned object, according to the present invention, each rotor piece is divided into two zones at the center of its axial length, that is, a zone A on the left side and a zone B on the right side, signs of skew angles of the zone A and the zone being different from each other.

Further, in order to achieve the above-mentioned object, according to the present invention, each stator piece is divided into two zones at the center of its axial length, that is, a zone A on the left side and a zone B on the right side, signs of skew angles of the zone A and the zone being different from each other.

Further, in order to achieve the above-mentioned object, according to the present invention, the above-mentioned rotor is divided into 3n pieces (where n is a multiple of 2), which are grouped in sets each having three zones, that is, a zone D on the left side, a zone E at the center and a zone F on the left side, and an absolute value of a skew angle of the zone E is smaller than those of the zone D and the zone F, and signs of the skew angles of the zone D, the zone E and the zone F are the same.

Further, in order to achieve the above-mentioned object, according to the present invention, the above-mentioned stator is divided into 3n zones (where n is multiples of 2), which are grouped in sets each having three zones, that is, a zone D on the left side, a zone E at the center and a zone F on the left side, and an absolute value of a skew angle of the zone E is smaller than those of the zone D and the zone F, and signs of the skew angles of the zone D, the zone E and the zone F are the same.

In order to achieve the above-mentioned object, according to the present invention, the above-mentioned rotor is divided into four rotor pieces respectively having reference lengths 0.29 L, 0.71 L, 0.71 L, 0.29 L where 2 L is an axial length of the rotor core, the rotor pieces of the reference length 0.29 L having a length set to a value which is the reference length 0.29 L with a tolerance in a range of −4 to +16% of the axial length of the rotor core while the rotor pieces having 0.71 L having a length set to a value which is the reference length 0.71 L with a tolerance of +4 to +16% of the axial length of the rotor core, effective magnetic pole angles of two rotor pieces which constitute a portion having the axial length L define skews which are continuous between in the respective rotor pieces while phase differences between electric angles at opposite ends of the two rotor pieces are equal to each other, the skews being continuous between the two rotor pieces, and two rotor pieces which constitute a portion having the remaining axial length L are arranged symmetric with the two rotor pieces having the length L with respect to the center of the axial length of the rotor core, and are circumferentially shifted therefrom by a phase difference equal to the phase difference between the electric angles at the opposite end of the rotor pieces so that skews are not continuous at the center of the axial length of the rotor core.

In order to achieve the above-mentioned object, according to the present invention, the above-mentioned stator is divided into four pieces respectively having reference lengths 0.29 L, 0.71 L, 0.71 L, 0.29 L where 2 L is an axial length of the rotor or the stator core, the length of the pieces of the reference length 0.29 L is set to a value which is the reference length 0.29 L with a tolerance of −4 to +16% of the axial length of the stator core while a length of the stator pieces having 0.71 L is set to a value having the reference length 0.71 L and a tolerance in a range of +4 to −16% of the axial length, and effective magnetic pole pieces of two rotor or stator pieces which constitute a portion having the axial length L define skews which are continuous in the respective stator pieces while phase differences between electric angles at opposite ends of the two stator pieces are equal to each other, the skews being continuous between the two stator pieces, and two stator pieces which constitute a portion having the remaining axial length L are arranged symmetric with the two rotor pieces constituting the axial length L of the stator core with respect the center of the axial length of the stator core, and are shifted therefrom by a phase difference equal to the phase difference between the electric angles at the opposite end of the stator pieces so that skews are not continuous at the center of the axial length of the stator.

Further, in order to achieve the above-mentioned object, according to the present invention, the rotor is axially divided into six pieces respectively having reference lengths of 2.25 L, 0.5 L, 0.25 L, 0.25 L, 0.5 L and 2.5 L where 2 L is an axial length of the rotor core, the lengths of the rotor pieces being set to values having the respective reference lengths with a tolerance of +/−4% of the axial length the rotor core, and effective magnetic pole opening angles of three rotor pieces which constitute a portion having an axial length L define skews which are continuous in the circumferential direction in the respective rotor pieces while phase differences between electric angles at opposite ends of the three rotor pieces are equal to one another, the skews of the three rotor pieces being continuous therebetween, and three rotor pieces constituting a portion having the remaining axial length L are arranged symmetric with the three rotor pieces constituting the portion of the axial length L with respect to the center of the axial length L of the rotor core, and circumferentially shifted therefrom by a phase difference equal to the phase difference between the electric angles at the opposite end surfaces of the rotor pieces so that the skews are not continuous at the center of the axial length of the rotor core.

Further, in order to achieve the above-mentioned object, according to the present invention, the stator is axially divided into six stator pieces respectively having reference lengths of 2.25 L, 0.5 L, 0.25 L, 0.25 L, 0.5 L and 2.5 L where 2 L is an axial length of the stator core, the axial length of the stator pieces being set to values having the reference lengths with a tolerance of +/−4% of the axial length L of the stator core;

effective magnetic pole opening angles of the stator pieces which constitute a portion having an axial length L define skews which are continuous in the respective stator pieces while phase differences between electrical angles at opposite ends of the three stator pieces are equal to one another, the skews of the three stator pieces being continuous therebetween, and three stator pieces constituting a portion having the remaining axial length L are arranged symmetric with the three stator pieces constituting the portion having the axial length L with respect to the center of the axial length of the stator core, and are circumferentially shifted therefrom by a phase difference equal to the phase difference between the electric angles at the opposite ends of the stator pieces so that the skews are not continuous at the center of the axial length of the stator core.

By the way, the rotor or the stator is divided into not less than four pieces (the word "divided" does include such meaning that a predetermined number of pieces which are apparently obtained, being divided into. Each rotor or stator piece has the effective magnetic pole opening angle contained therein and having an axial length and a circumferential relative position which are determined so as to induce a force orthogonal to a deformation mode of in the axial direction of the stator. The effective magnetic pole opening angle is an angle at which actual magnetic flux of a permanent magnetic or the like is present with respect to the rotary shaft.

The above-mentioned rotor or stator is divided into not less than 4 or 4n pieces (where n is an integer) so as to have lengths and electric angles which are set in such a relationship that corresponding lengths and corresponding positions which are shifted in the circumferential direction, and they are arranged in a set order, on the base of three relations with respect to an interesting revolution order:

A relation 1 as to zero order mode of the stator core:

$$\text{Re}\left\{\int_{-L}^{L} f(x)\,dx\right\} = 0 \text{ and} \quad (2)$$

$$\text{Im}\left\{\int_{-L}^{L} f(x)\,dx\right\} = 0$$

A relation 2 as to a first order mode of the stator core:

$$\text{Re}\{f(-x)\} = \text{Re}\{f(x)\} \text{ or} \quad (3)$$

$$\text{Im}\{f(-x)\} = \text{Im}(fx) \text{ or}$$

$$\int_{-L}^{L} x\text{Re}\{f(x)\}\,dx = 0 \text{ or}$$

$$\int_{-L}^{L} x\text{Im}\{f(x)\}\,dx = 0$$

A relation 4 as to a second order mode of the stator core:

$$\text{Re}\{f(-x)\} = -\text{Re}\{f(x)\} \text{ or} \quad (4)$$

$$\text{Im}\{f(-x)\} = -\text{Im}\{f(x)\} \text{ or}$$

$$\int_{-L}^{L}\left(x - \frac{1}{2}\right)\text{Re}\{f(x)\}\,dx = 0 \text{ or}$$

$$\int_{-L}^{L}\left(x - \frac{1}{2}\right)\text{Im}\{f(x)\}\,dx = 0$$

where 2 L is the axial length of the rotor or stator core, x is a position in an axial direction (x=0 at the axial center, −L≦x≦L), and f(x) (which is a complex).

In such a case that the rotor or stator is divided into four rotor or stator pieces (including 4n), the axial lengths of the four rotor or stator pieces which are ideally obtained by the above-mentioned three formulae, are basically 0.29 L, 0.71 L, 0.71 L and 0.29 L, and the corresponding lengths are determined in accordance with these criterion lengths. Further, the effective magnetic pole opening angles of the respective rotor or stator pieces are set so as to define skews which are continuous between the axial lengths of the rotor or stator pieces so that the phase difference of the electric angles is n between the axial sections of the rotor or stator pieces having 0.29 L and 0.71 L while the phase difference of the electric angles is −π between the axial sections of the rotor or stator pieces having 0.71 L and 0.29 L, the skews being continuous between the rotor or stator pieces having 0.29 L and 0.71 L, and 0.71 L and 0.29 L, but not continuous between adjacent surfaces of the rotor or stator pieces having 0.71 L and 0.71 L.

In such a case that the rotor or stator is divided into six (including 6n) rotor or stator pieces, the axial lengths of the six rotor or stator pieces which can be ideally obtained by the above-mentioned three relations, are 0.25 L, 0.5 L, 0.25 L, 2.5 L, 0.5 L and 2.5 L, and corresponding lengths are set by using these criterion lengths. Further, the effective magnetic pole opening angles of the respective rotor or stator pieces define skews which are continuous between the axial lengths of the rotor or stator pieces so that the phase difference of the electric angles between the axial sections of the rotor or stator pieces is π in one of halves which are bisected into at the center but −π in the other one of the halves in the circumferential direction. Further, they are set being shifted by a phase difference π of the electric angle so that the skews of the rotor or stator pieces which have 0.25 L, 0.5 L, 0.25 L and which are bisected into at the center are continuous between the adjacent rotor or stator pieces, but the skews of the center rotor or stator pieces having 0.25 L and 0.25 L are not continuous between the adjacent surfaces of the rotor or stator pieces.

Although explanation has been hereinabove made of the phase differences of the electric angles with respect to the interesting revolution orders, the phase differences of the electric angles with respect other revolution orders are γ instead of π and −γ instead of −π.

According to the present invention, there may be provided a rotating electric machine which reduces, of vibration and noise caused by drive operation of the rotating electric machine, vibration and noise of a motor excited by a radial electromagnetic exciting force.

Explanation will be hereinbelow made of preferred embodiments of the present invention with reference to the accompanying drawings which are:

Other objects, features and advantages of the invention will become apparent from the following description of the embodiments of the invention taken in conjunction with the accompanying drawings.

DESCRIPTION OF PREFERRED EMBODIMENTS

Embodiment 1

Figure 1:
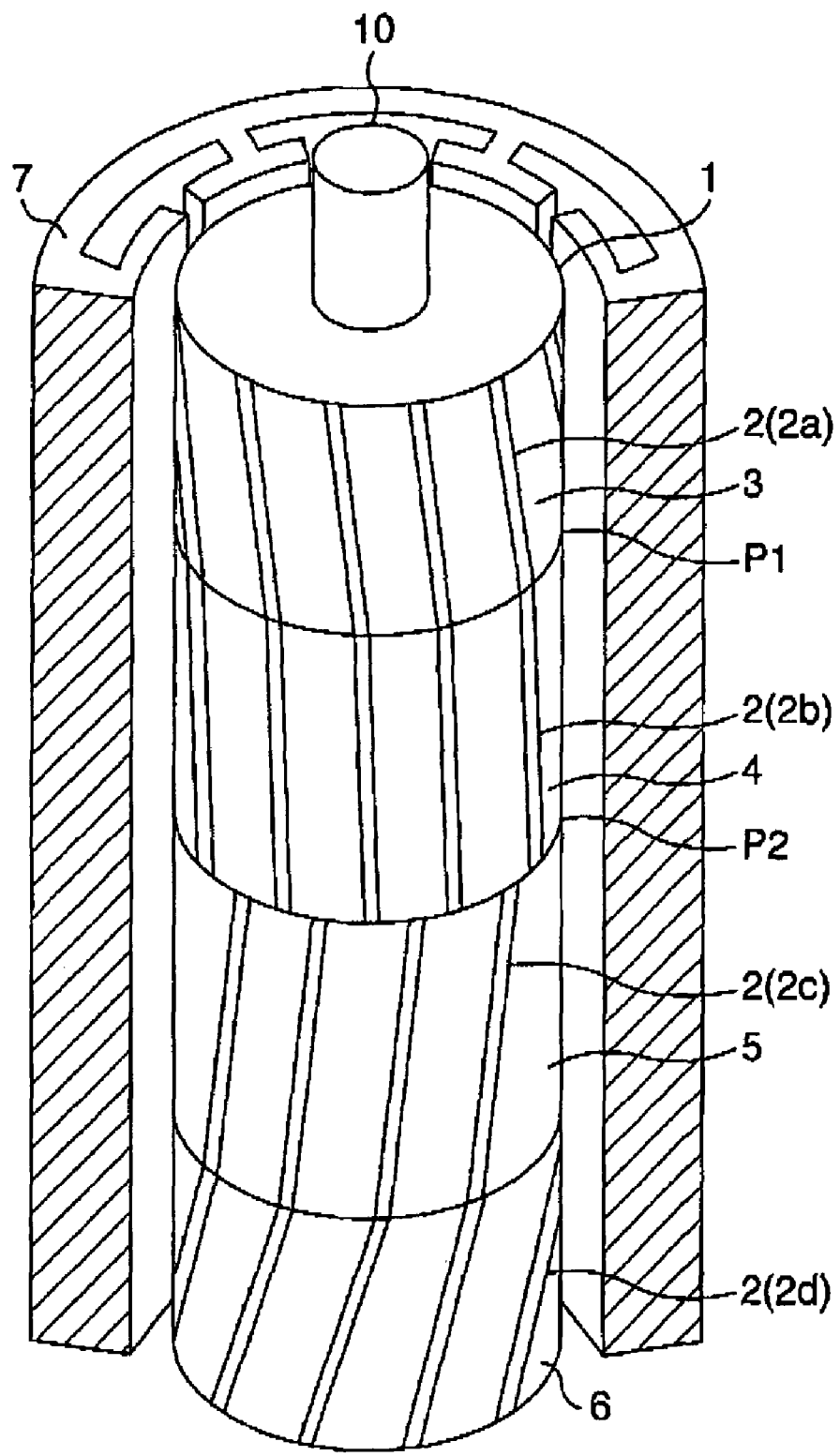
FIG. 1 is a perspective view illustrating a rotating electric machine incorporating an embodiment of the present invention.
Figure 2:
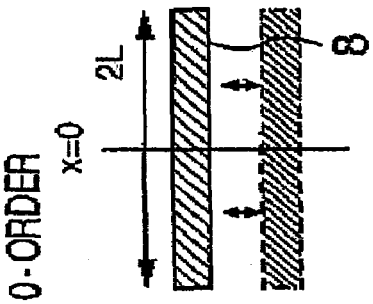
FIG. 2 is a view for explaining orthogonal conditions which are satisfied by an exciting force pattern and an electromagnetic exciting force of the rotating electric machine.
Figure 2:
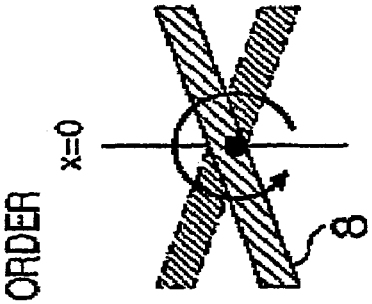
Figure 2:
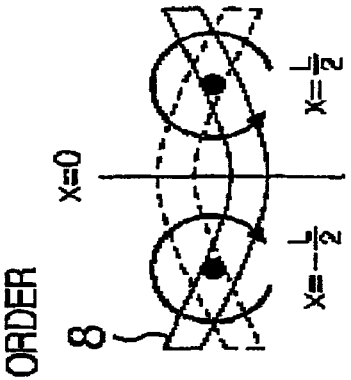
Figures 2, 3:
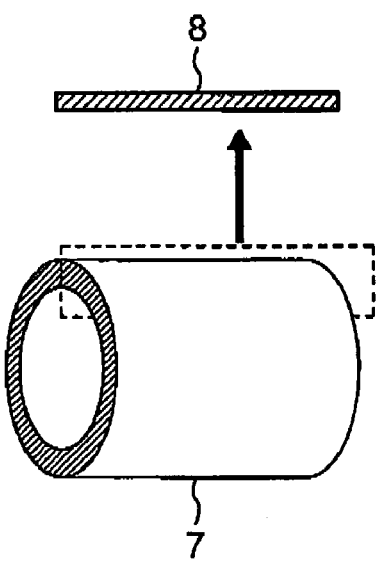
FIG. 3 is a view illustrating a positional relationship between a stator core and an axial section of the stator core.

FIG. 1 is a perspective view illustrating a rotating electric machine incorporating an embodiment of the present invention, and FIG. 2 is a view which shows orthogonal conditions of exciting forces. Table 1 exhibits F, M1 and M2 with respect to orthogonal conditions of the skew patterns.

TABLE 1

| Skew | 0-Order Mode F Exciting force | | 1-Order Exciting Force M1 (Moment at x = 0 is set to 0) | | 2-Order Exciting Force M1 (Moment at x = ±L/2 is set to 0) | |
|---|---|---|---|---|---|---|
| | Re{F} | Im{F} | Re{M1} | Im{M1} | Re{M1} | Im{M2} |
| No Skew | $2\beta L$ | 0 | 0 | 0 | 0 | 0 |
| One Slot Skew | 0 | 0 | $2\beta \frac{L^2}{\pi} \approx 0.64\, \beta L^2$ | 0 (Even Function) | 0 (Odd Function) | $4\beta \frac{L^2}{\pi^2} \approx 0.41\, \beta L^2$ |
| V-Like Skew | 0 | 0 | 0 (Even Function) | 0 (Even Function) | $-\beta \frac{L^2}{\pi} \approx -0.32\, \beta L^2$ | 0 |
| λ-Like Skew | 0 | 0 | 0 | $\frac{2\beta L^2}{\pi^2}(\sqrt{2}-1) \approx 0.08\, \beta L^2$ | 0 (Odd Function) | 0 (Odd Function) |
| Six-Division Optimum Skew | 0 | 0 | 0 | $\frac{\beta L^2}{2\pi^2} \approx 0.05\, \beta L^2$ | 0 (Odd Function) | 0 (Odd Function) |

Referring to FIG. 1, a core of a rotor 1 is composed of a stack of steel plates, which is axially divided into a plurality of blocks or rotor pieces. In an embodiment shown in FIG. 1, the rotor 1 is divided into four rotor segments 3, 4, 5, 6. There are formed a plurality of grooves having lengths equal to those of the four pieces 2, 3, 5, 6 fitted on a rotary shaft 10, at equal pitches, which define oblique skews. Secondary conductors 2a, 2b, 2c, 2d are formed in the grooves by die-casting or the like, having effective magnetic pole opening angles. In FIG. 1, although the effective magnetic pole opening angles are defined by the secondary conductors 2a, 2b, 2c, 2d, they may also be materialized by permanent magnets.

A skew pattern of an electric exciting force which is materialized by optimizing a configuration shown in FIG. 1 will be referred to as λ-like skews.

The axial lengths of the rotor pieces 2, 4, 5, 6 and electric angles which are determined, depending upon circumferential positions of effective magnetic pole opening angles are obtained in view of the following consideration. According to the present invention, the pattern is in combination of an axial length and an electric angle phase difference with which a radial electromagnetic exciting force induced by an electric characteristic is orthogonal to an axial mode of the stator core 7.

With such estimation that an inherent mode of the stator core 7 of the rotating electric machine 100 which causes vibration and noise is a 0-, 1- or 2-order bending mode of a beam, consideration will be made of a pattern of electromagnetic exciting force, which can restrain the generation of this mode.

In order to simplify the consideration, there may be estimated such that a structure only has a stator core 7, an axial core length is 2 L equal to a core length of the stator 1, boundary conditions of the stator core 7 are such that both ends are free or completely constrained, the stator core 7 is a beam element, axial length of the rotator pieces 3, 4, 5, 6 are equal to those of the secondary conductors 2 included in the rotor pieces 3, 4, 5, 6. In the case of the provision of end rings to the rotor 1, it is estimated that the axial length excludes lengths of the end rings.

Since the oblique skews are provided to the rotor pieces 3, 4, 5, 6, an exciting force f(x) becomes complex. In this case, with respective to beam bending modes having various orders, there may be considered the following orthogonal conditions as to the exciting force as shown in FIG. 2:

$$\text{Re}\left\{\int_{-L}^{L} f(x)\,dx\right\} = 0 \text{ and} \tag{5}$$

$$\text{Im}\left\{\int_{-L}^{L} f(x)\,dx\right\} = 0 \text{ or}$$

$$\text{Re}\{f(-x)\} = \text{Re}\{f(x)\} \text{ or}$$
$$\text{Im}\{f(-x)\} = \text{Im}\{f(x)\}$$

$$\int_{-L}^{L} x\,\text{Re}\{f(x)\}\,dx = 0 \text{ or} \tag{6}$$

$$\int_{-L}^{L} x\,\text{Im}\{f(x)\}\,dx = 0$$

$$\text{Re}\{f(-x)\} = -\text{Re}\{f(x)\} \text{ or} \tag{7}$$
$$\text{Im}\{f(-x)\} = -\text{Im}\{f(x)\} \text{ or}$$

$$\int_{-L}^{L}\left(x - \frac{1}{2}\right)\text{Re}\{f(x)\}\,dx = 0 \text{ or}$$

$$\int_{-L}^{L}\left(x - \frac{1}{2}\right)\text{Im}\{f(x)\}\,dx = 0$$

In the above-mentioned orthogonal conditions, Formula (5) exhibits such a condition that occurrence of a 0-order beam bending mode by the exciting force is prevented, Formula (6) exhibits a condition in which occurrence of a 1-order beam bending mode by the exciting force is prevented and Formula (7) exhibits a condition in which occurrence of a 2-order beam bending mode by the exciting force is prevented. If these conditions are satisfied, vibration caused by 0-order, 1-order and 2-order modes of beam bending can be restrained.

Axial lengths and skew angles of rotor pieces are determined in such a case that the formulae (5), (6) and (7) are satisfied and the rotor are divided into a practical number or pieces which are four, as follows:

In order to simplify the development of the formulae, estimation is made such that the stator core 7 is a one-dimensional beam in the x-axial direction, and a force exerted to the stational core 7 is a one-dimensional exciting force in the y-axial direction. The axial length of the stator core 7 is 2 L.

If a skew angle is provided so that an electric angle δ is shifted by π between opposite ends of each of the rotor pieces 3, 4, 5, 6 obtained by dividing the rotor 1 with 4, FIG. 4 is obtained. In view of simplification, the exciting force f(x) is exhibited by the following formulae (8) and (9):

$$\text{Re}\{f(x)\} = \beta \sin \delta \tag{8}$$

$$\text{Im}\{f(x)\} = \beta \cos \delta \tag{9}$$

Figure 4A:
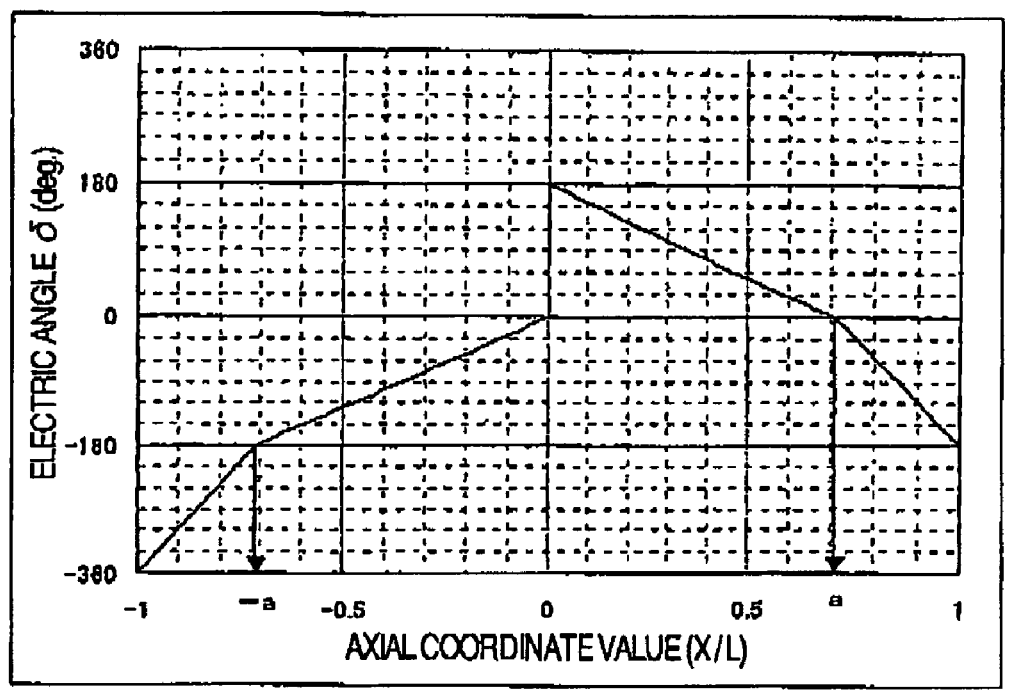
FIGS. 4a and 4b are view which shows an electric angle and an exciting force caused by λ-like skews, respectively.
Figure 4B:
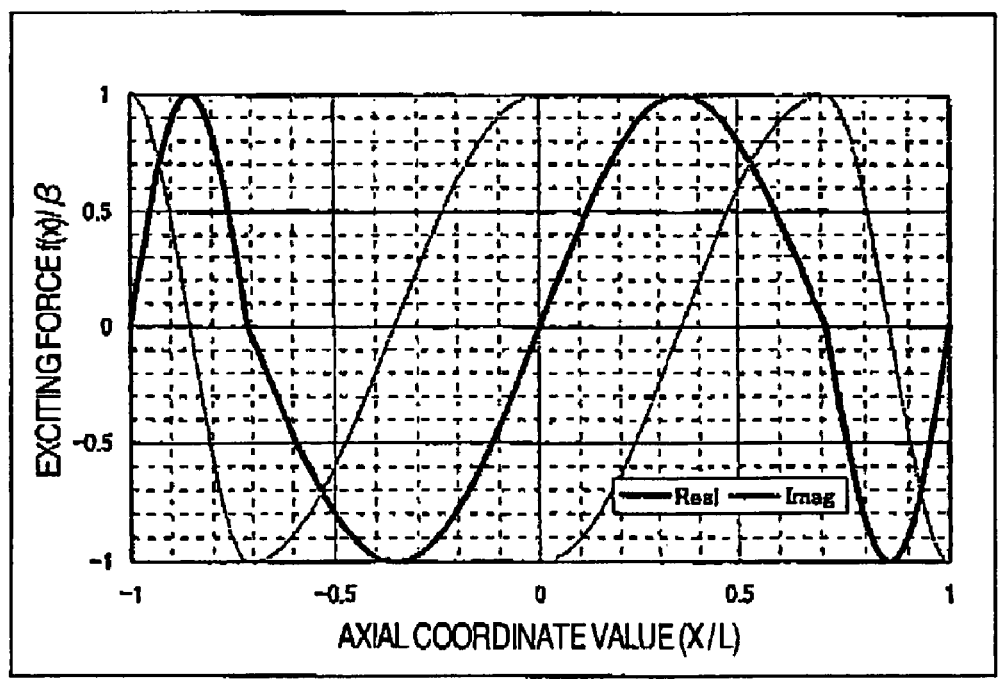
Figure 5A:
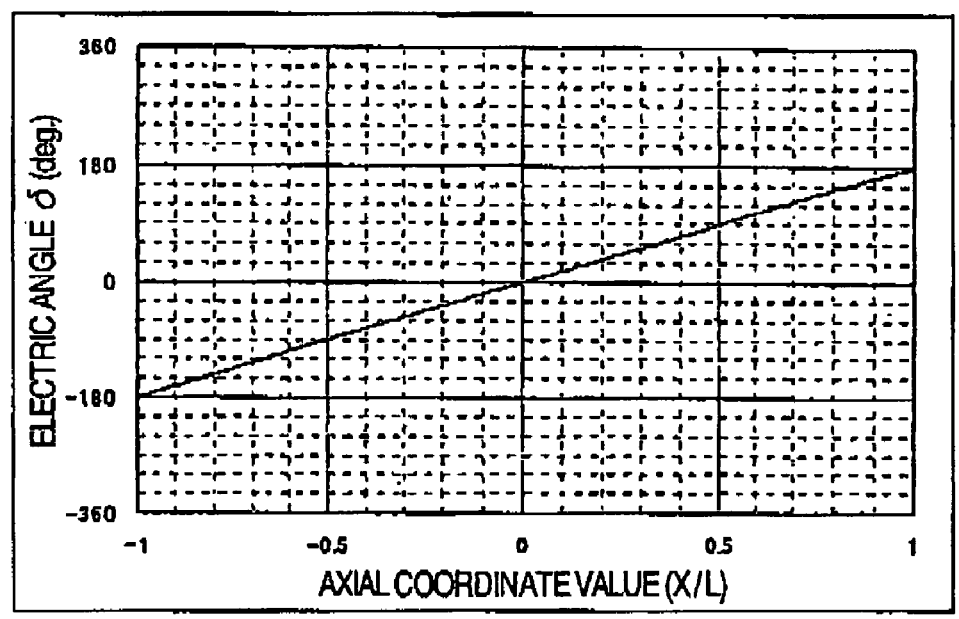
FIGS. 5a and 5b are views which show an electric angle and an exciting force caused by one slot skew, respectively.
Figure 5B:
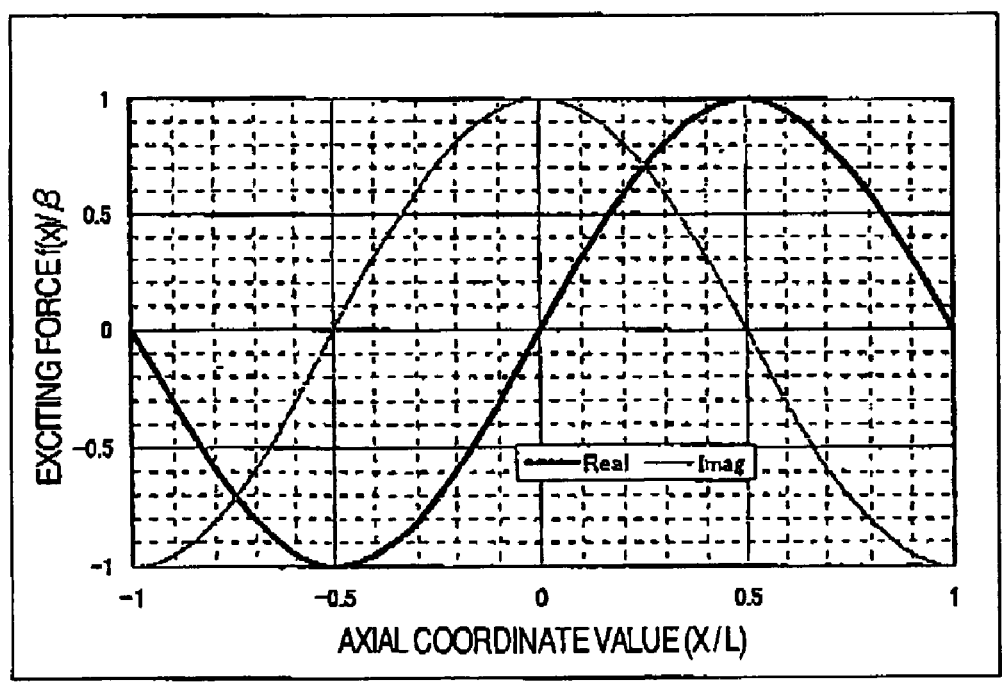
Figure 6A:
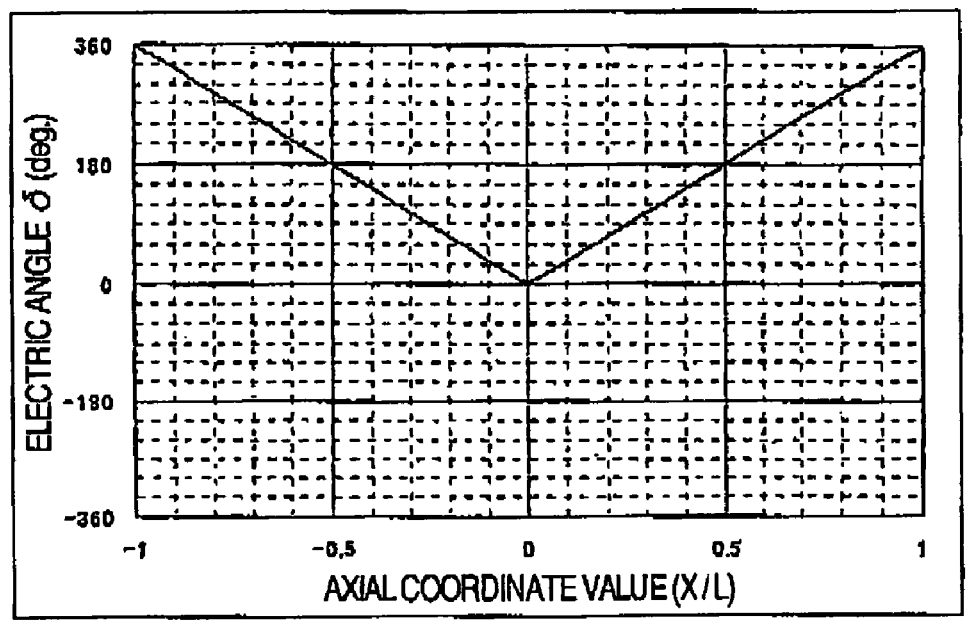
FIGS. 6a and 6b are views which show an electric angle and an exciting force caused by V-like skews, respectively.
Figure 6B:
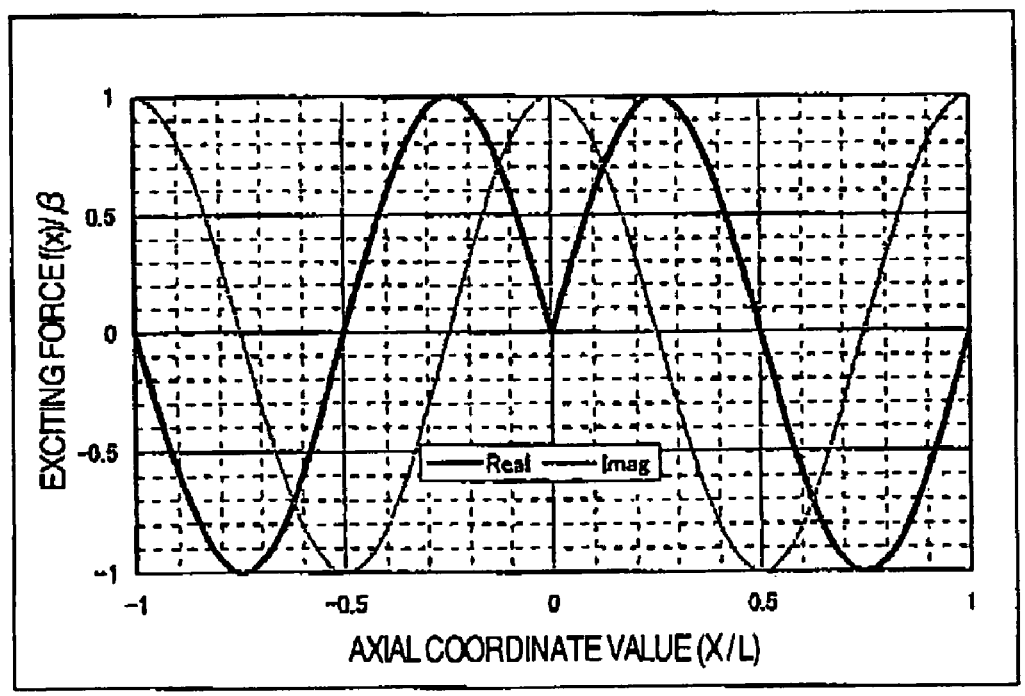

FIG. 4b shows an exciting force obtained by Formulae (8) and (9).

The electric angle δ shown in FIG. 4a satisfies the following formula (10):

$$\text{Re}\left\{\int_{-L}^{L} f(x)\,dx\right\} = 0 \text{ and} \tag{10}$$

$$\text{Im}\left\{\int_{-L}^{L} f(x)\,dx\right\} = 0$$

Further, Re{M1} of the moment M1 is exhibited by the following formula 11:

$$\text{Re}\{M1\} = \tag{11}$$

$$2\beta\left\{\int_{0}^{a} x\sin\frac{\pi}{a}x\,dx - \int_{a}^{L} x\sin\frac{\pi}{L-a}(x-a)\,dx\right\} = 2\beta\frac{2a^2 - L^2}{\pi}$$

When Re{M1}=0, the formula 11 becomes:

$$a = \frac{\sqrt{2}}{2}L = 0.71L \tag{11}$$

In this case, Im{M1} is exhibited by the following formula (12):

$$\text{Im}\{M1\} = 2\beta\left\{\int_{0}^{a} x\cos\frac{\pi}{a}x\,dx - \int_{a}^{L} x\cos\frac{\pi}{L-a}(x-a)\,dx\right\} \tag{12}$$

$$= \frac{2\beta L^2}{\pi^2}\left(\frac{2a}{L} - 1\right)$$

$$= \frac{2\beta L^2}{\pi^2}(\sqrt{2} - 1)$$

Further, {M2} and Im{M2} are odd functions.

The above-mentioned relations can be also satisfied even if the stator core 7 is considered as a cylindrical surface, and the exciting force as a three-dimensional exciting force of a n-order ring around the x-axis as a center.

Thus, the rotor 1 is divided into rotor pieces 3, 4, 5, 6 having axial lengths exhibited by the following formulae (13):

$$\left[1-\frac{1}{\sqrt{2}}\right]L, \frac{1}{\sqrt{2}}L, \frac{1}{\sqrt{2}}L, \left[1-\frac{1}{\sqrt{2}}\right]L \quad (13)$$

That is, 0.29 L, 0.71 L, 0.71 L, 0.29 L, and skews are continuously set so that the phase difference of respective electric angles is π between the axial sections of the rotor pieces 3, 4, but is -π between the axial sections of the rotor pieces 5, 6 while the phase difference of the electric angles is continuous between the adjacent surfaces of the rotor pieces 3 and 4, and 5 and, 6 but is π between adjacent surfaces of the rotor pieces 4 and 5.

Accordingly, the absolute values of skew angles of the rotor pieces 3, 6 at opposite ends are larger than those of the rotor pieces 4, 5 at the center. Thus, a moment induced between a 1-rder beam bending mode of the stator core 7 and the exciting force may be effectively cancelled out, thereby it is possible to obtain such an advantages as to reduce vibration and noise even in the configuration in which a skew change-over point is deviated.

Further, n times (n is an integer) of the configuration shown in FIG. 1 also can satisfy the orthogonal conditions shown in FIG. 2.

Values of F, M1 and M2 as to the patterns of λ-like skews and other skews are listed in table 1. In this table 1, "no skew" indicates such a case that the rotor or the stator is not divided while no skew is provided, "one slot skew" indicates such a case that a skew is provided so that an electric angle between axial sections of the rotor 1 or the stator core 7 becomes n over the entire axial length, and V-like skews indicates such a case the skews are provided, being shifted by one slot so that they are turned back at the center. It is noted that the above-mentioned configurations have been well-known, FIGS. 5a to 6b shows electric angles δ and exciting forces caused by the one slot skew and the V-like skews.

Figure 7:
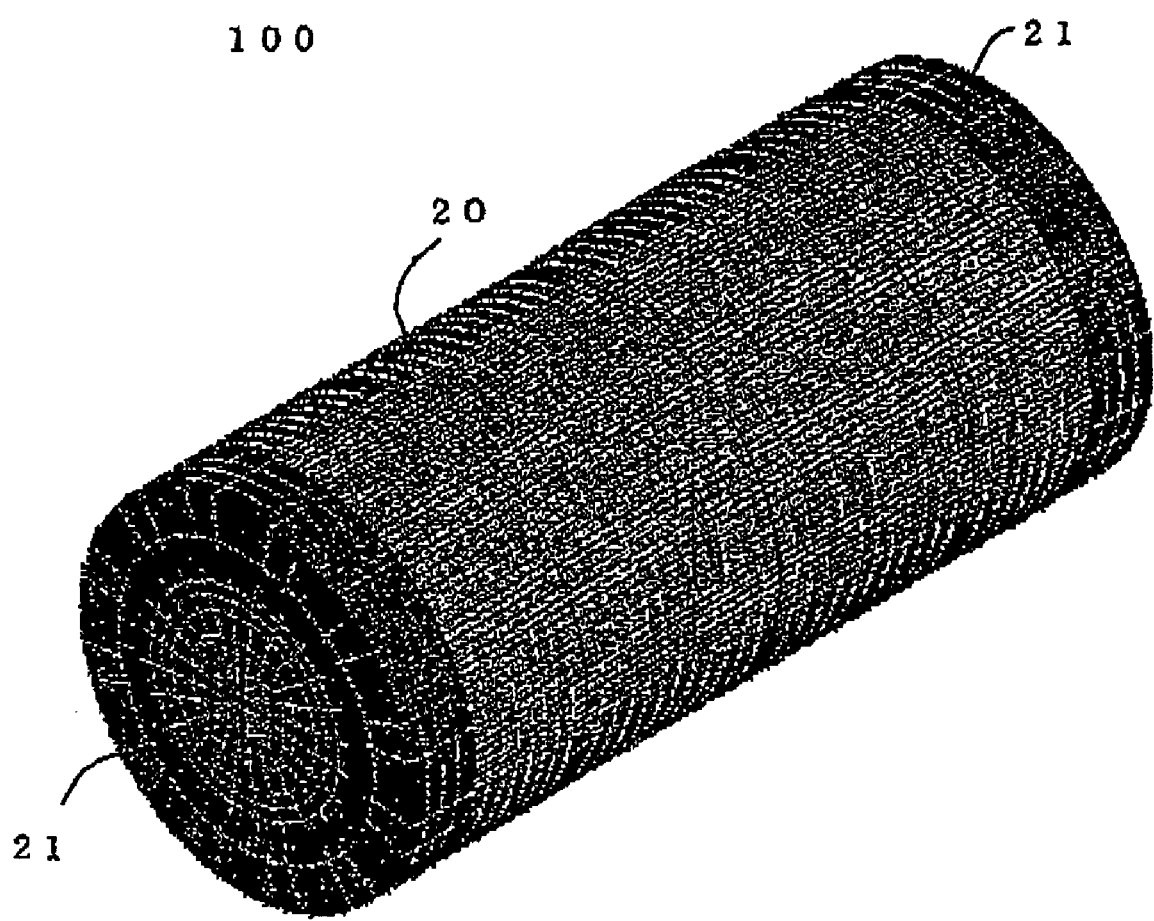
FIG. 7 is a view illustrating a model of a rotating electric machine 100 for calculating mean surface speeds.

Referring to FIG. 7 which shows a calculation model of a rotating electric machine used for calculating surface speeds, means surface speeds are obtained by using the calculation model of the rotating electric machine. The calculation model of the rotating electric machine 100 has an outer surface composed of a frame 20 and brackets 21. The stator core 7 is shrinkage-fitted in the inner periphery of the frame 20. The rotor 1 is provided in the rotating electric machine through the intermediary of bearings fitted in the brackets 21.

Figure 8:
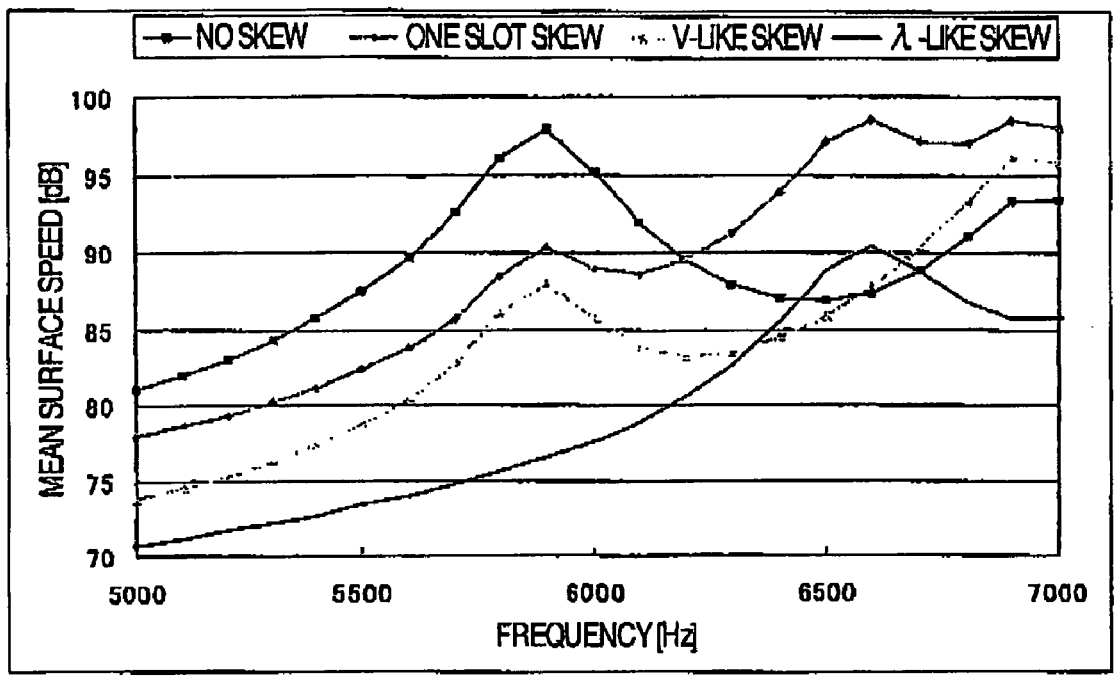
FIG. 8 is a view which shows mean surface speeds when no skew, one slot skew, V-like skews and λ-like skews are inputted in the model of the rotating electric machine 100.

FIG. 8 shows frequency response obtained when a radial exciting force having a constant amplitude is inputted in the axial direction of the annular 0-order by no skew, one slot skew, V-like skews and λ-like skews.

Figure 9:
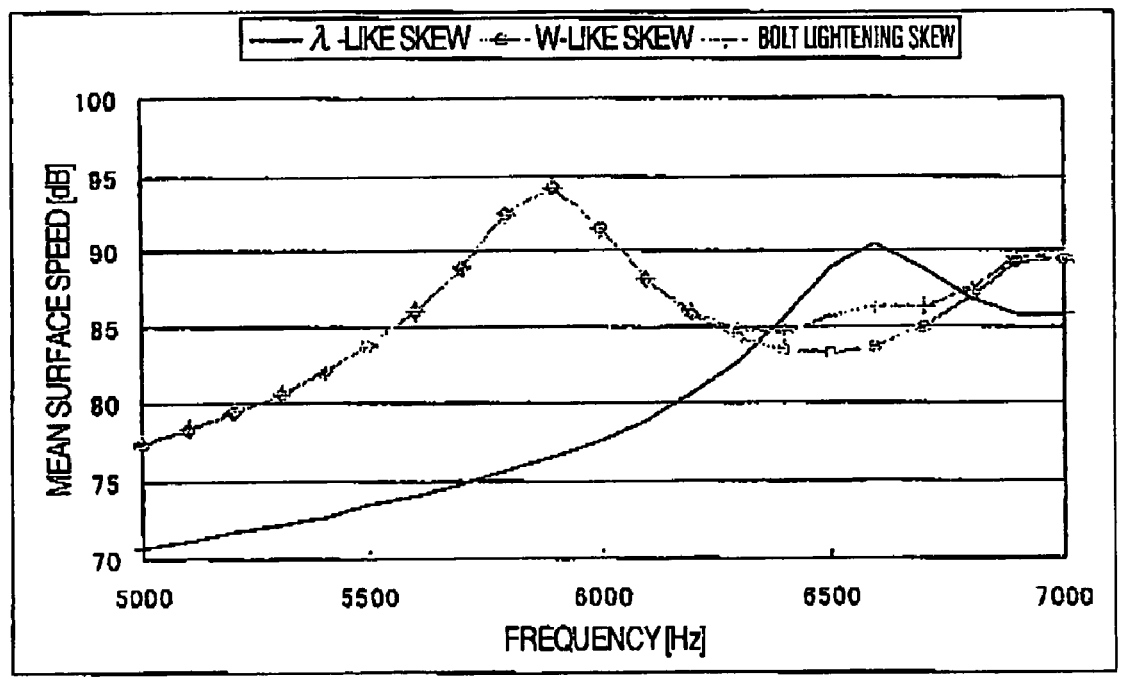
FIG. 9 is a view which shows mean surface speeds when λ-like skews, one slot skew, V-like skews and lightening bolt-like skews are inputted in the model of the rotating electric machine 100.

Further, FIG. 9 shows frequency response of means surface speeds when a radial exciting force having a constant amplitude is inputted in the axial direction of the annular 1-order by λ-like skews, W-like skews and lightening bolt skews.

Figure 10:
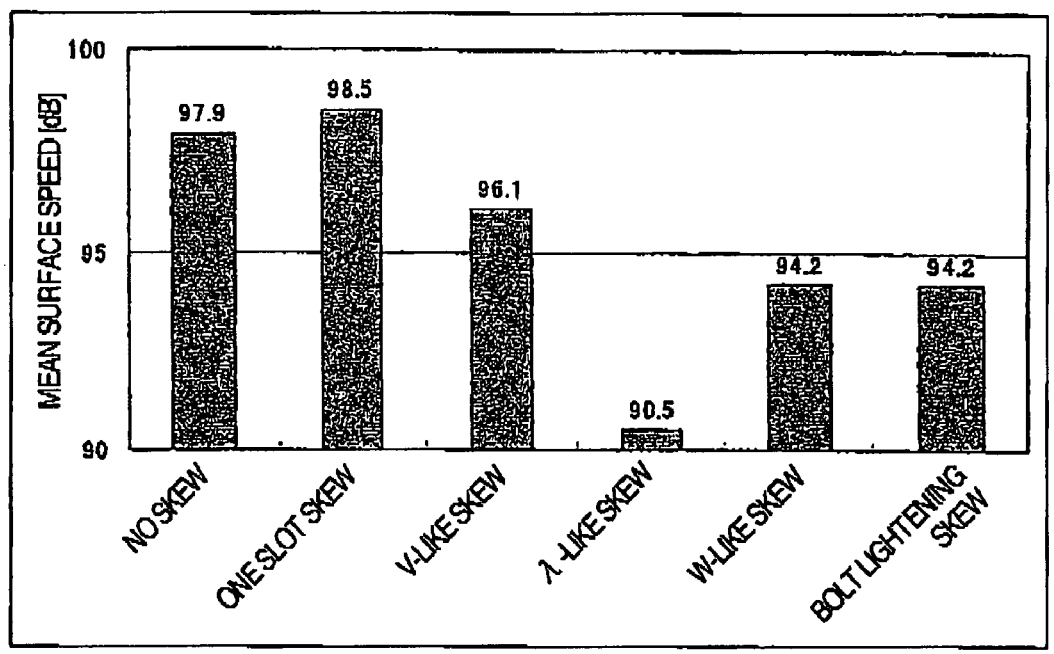
FIG. 10 is a view which shows maximum values of means surface speeds when no skew, one slot skew, V-like skews, λ-like skews, W-like skews and lightening bolt skews are inputted in the model of the rotating electric machine 100.

FIG. 10 shows maximum amplitudes of mean surface speeds when the various skews are inputted. The means surface speed of the λ-like skews at the peak frequency is lower than larger than those of the other skews by a value from 3.7 to 8 dB, that is, an effect of vibration reduction is exhibited.

Figure 11:
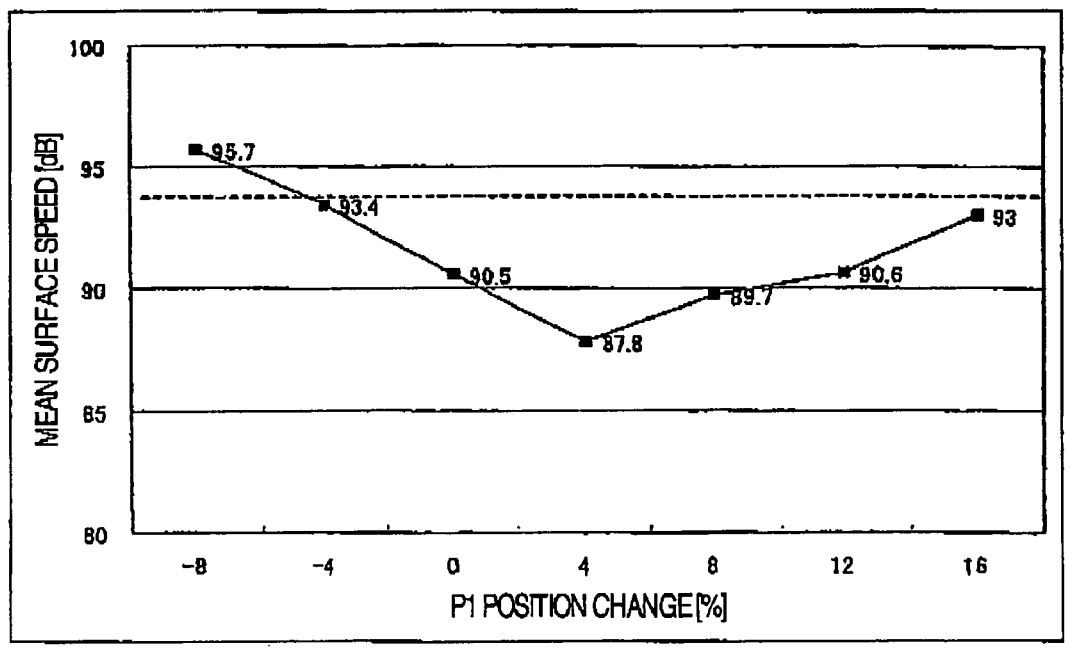
FIG. 11 is a view which shows maximum values of means surface speeds when a skew change-over position P1 is changed with the λ-like skews.

FIG. 11 shows maximum amplitudes of means surface speeds of the piece having 0.71 L which are obtained by changing the change-over position PI from -8 to +16% of the axial length of the rotor core. The means surface speed has a minimum value at +4%. The maximum amplitude thereof has a value which is lower than the maximum amplitude of 94.2 dB of the means surface speed the W-like skews or the lightening bolt skews in a range from -4 to +16%. With this tolerance in this range, there may be exhibited an effect of vibration reduction.

Figure 12:
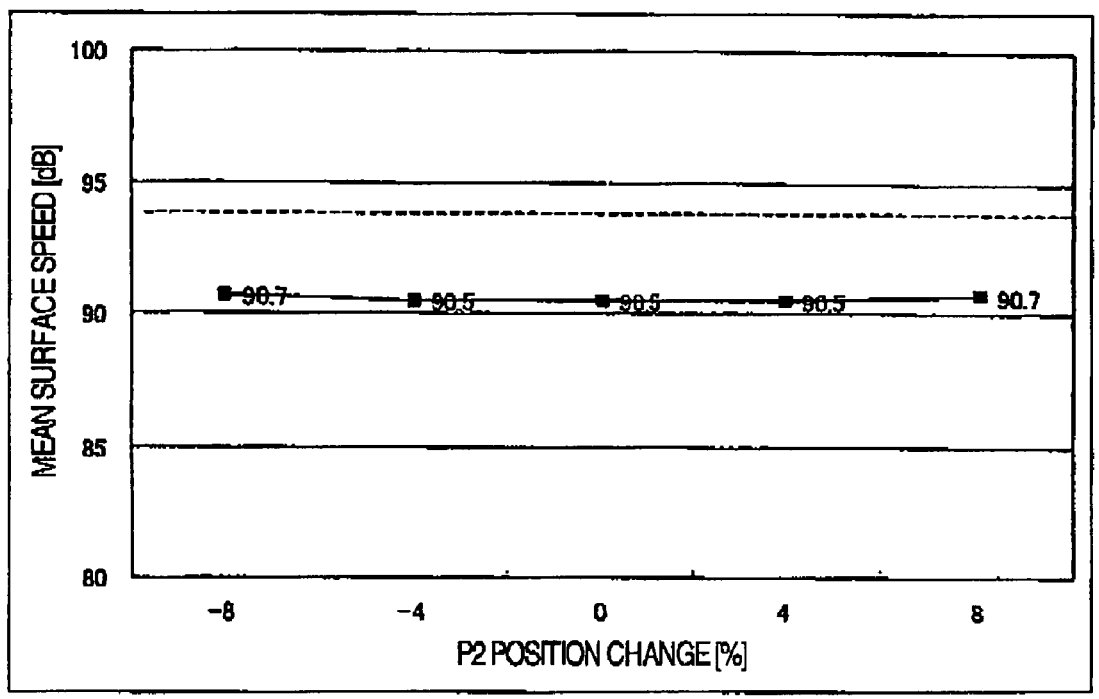
FIG. 12 is a view which shows maximum values of means surface speeds when a skew change-over position P2 is changed with the λ-like skews.

FIG. 12 shows maximum amplitudes of means surface speeds of the pieces having 0.29 L when the change-over position P1 is changed from -8 to +16% of the axial length of the rotor core. In this tolerance range, the maximum amplitude of the means surface speed is not changed substantially, there may be exhibited an effect of vibration reduction even though the center skew change-over point is deviated.

The configuration of the present embodiment also exhibits an effect of reduction of a thrust force.

Explanation will be hereinbelow made of other embodiments.

Embodiment 2

Figure 13:
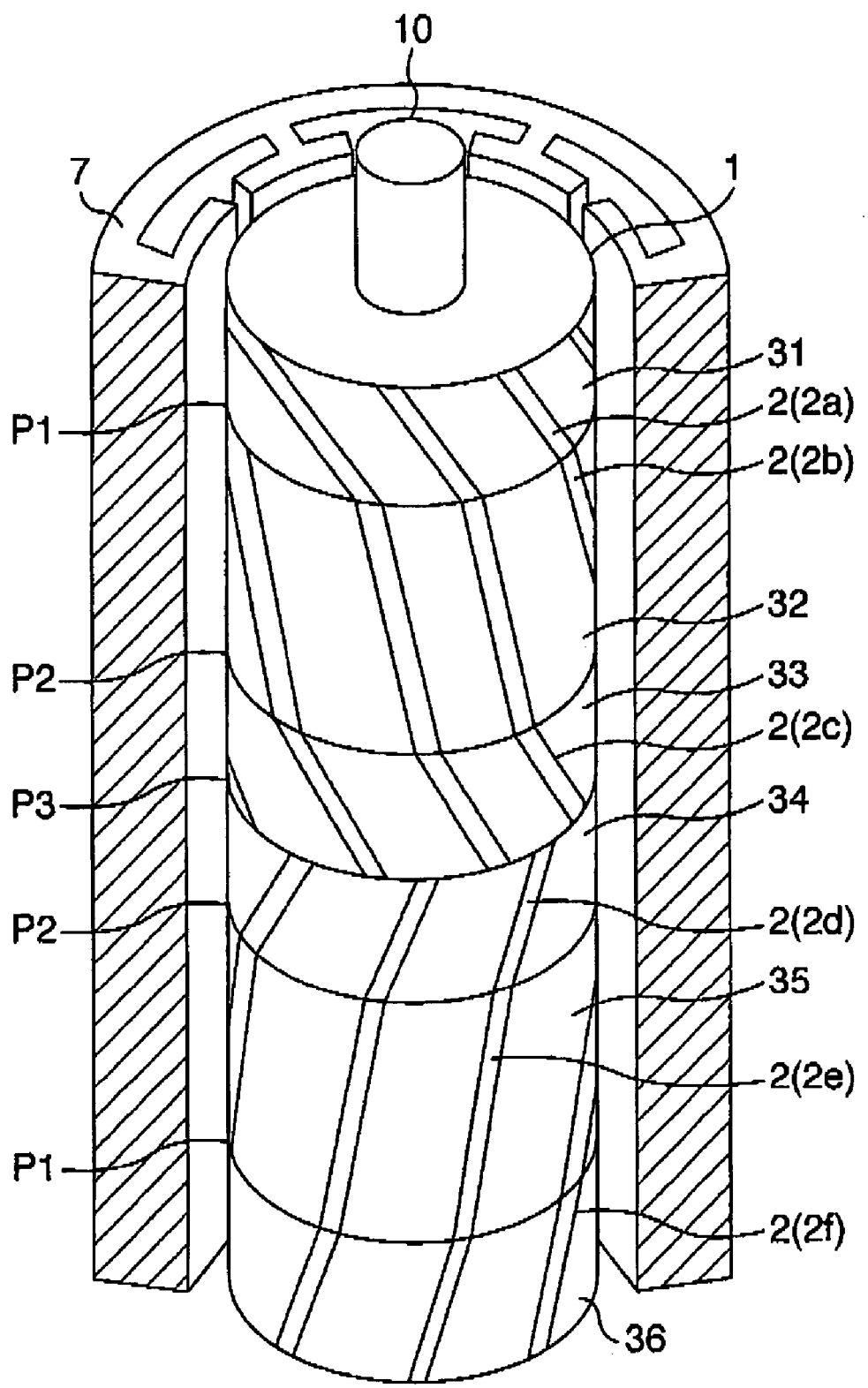
FIG. 13 is a view illustrating a rotating electric machine incorporating another embodiment of the present invention.

Referring to FIG. 13 which shows an embodiment of the rotor 1 and the stator 7 of an induction motor as an example of the rotating electric machine 100 according to the present invention, the core of the rotor 1 is composed of a stack of the steel plates, which is divided in the direction of the axial length into a plurality of blocks or rotor pieces. The rotor 1 shown in FIG. 13 is composed of rotor pieces 31, 32, 33, 34, 35, 36. A plurality of slots having axial lengths which are equal to those of the rotor pieces 31, 32, 33, 34, 35, 36 which are fitted to a shaft 10 are formed at equal pitches in the circumferential direction so as to obtain oblique skews, and secondary conductors 2a, 2b, 2c, 2d, 2e, 2f defining an effective magnetic opening angles are formed in the slots by aluminum die-casting. There is also shown the stator 7.

In the embodiment shown in FIG. 13, the secondary conductors 2a, 2b, 2c, 2d, 2e, 2f defining an effective magnetic opening angles are formed so as to be continuous between the conductors 2a, 2b, 2c and between the conductors 2d, 2e, 2f, but are formed being shifted by, for example, ½ pitch in the circumferential direction so that the electric angles are shifted by π between the rotor pieces 2c, 2d. Further, the secondary conductors 2 may have their rounded connections between the pieces 2a, 2b, 3c and between the pieces 2c, 2d, 2f so as to allow aluminum die-casting to flow smoothly. In FIG. 13, although the secondary conductors 2 define effective magnetic pole opening angles, the effective magnetic pole opening angles may be also obtained by permanent magnets.

A skew patterns of electromagnetic exciting force which is materialized by optimizing the configuration shown in FIG. 13 will be hereinbelow referred to as six-division optimum skews, The axial lengths of the rotor pieces 31, 32, 33, 34, 35, 36 and electric angles which are determined depending upon circumferential positions of the effective magnetic pole opening angles will be determined similar to the embodiment 1.

It is noted that the coordinates in which the formulae are developed are similar to the embodiment 1.

Skew angles are provided so that the electric angles are shifted by π between the opposite ends of the rotor pieces 31, 32, 33, 34, 35, 36 which are obtained by dividing the rotor 1 with 6 as shown in FIG. 4a. For the simplification, the exciting force f(x) is exhibited by the following formulae (14) and (15):

$$Re\{f(x)\}=\beta \sin \delta \quad (14)$$

$$Im\{f(x)\}=\beta \cos \delta \quad (15)$$

Figure 14A:
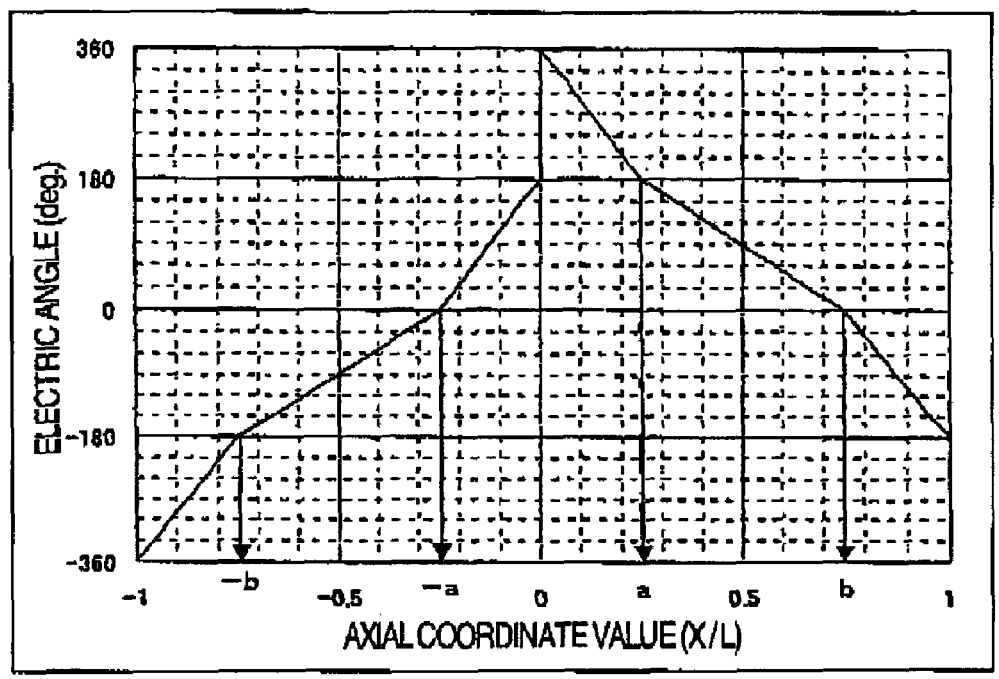
FIGS. 14a and 14b are views illustrating an electric angle and an exciting force caused by six-division optimum skews, respectively.
Figure 14B:
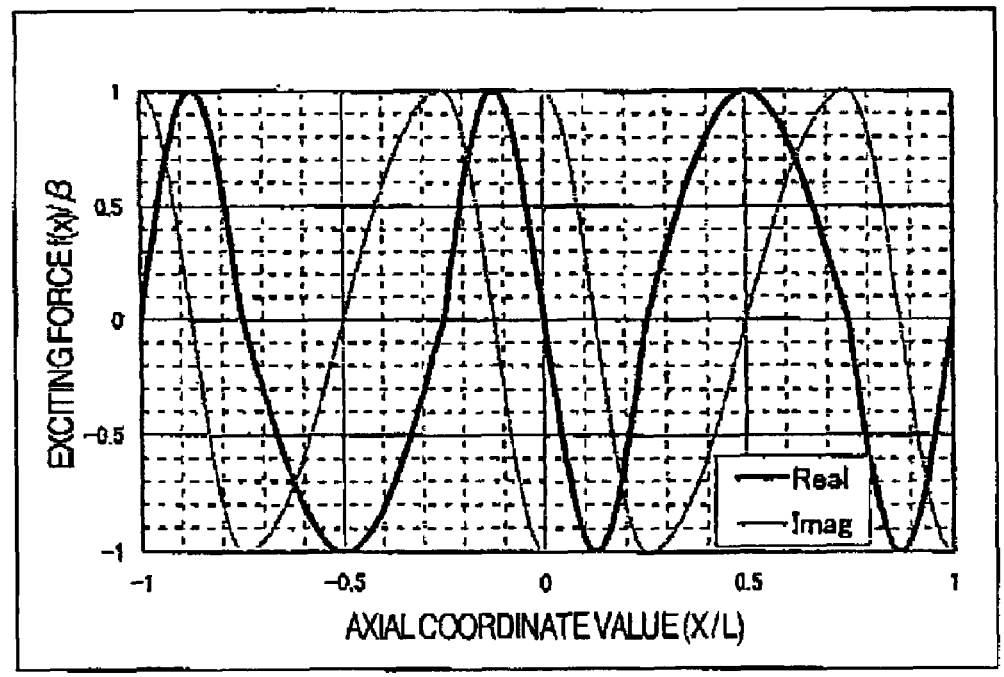

FIG. 14(b) shows an exciting force obtained by the formulae (14) and (15).

The electric angle shown in FIG. 14a satisfies the following formula (16):

$$\operatorname{Re}\left\{\int_{-L}^{L} f(x)\,dx\right\} = 0 \text{ and } \operatorname{Im}\left\{\int_{L}^{L} f(x)\,dx\right\} = 0 \quad (16)$$

Re{M1} of the moment M1 is exhibited by the following formula (17):

$$\operatorname{Re}\{M1\} = 2\beta \begin{cases} -\int_{0}^{aL} x\sin\frac{\pi}{aL}x\,dx + \\ \int_{aL}^{bL} x\sin\frac{\pi}{(b-a)L}(x-aL)\,dx - \\ \int_{bL}^{L} \sin\frac{\pi}{(1-b)L}(x-bL)\,dx \end{cases} \quad (17)$$

$$= 2\beta^2 \frac{2(b^2 - a^2) - 1}{\pi}$$

In this case, if Re{M1}=0, $$2(b^2 - a^2) = 1 \quad (18)$$

is obtained. The values which satisfy the formula (18) are a=0.25 and b=0.75

At this time, Im{M1} is obtained by the following formula (19):

$$\operatorname{Im}\{M1\} = \frac{\beta L^2}{2\pi^2} \quad (19)$$

Further, the Re{M1} and Im{M1} are odd functions.

The above-mentioned relations can be satisfied even though the stator core 7 is considered as a cylindrical surface and the exciting force as an annular n-order three-dimensional exciting force of around the x-axis at a center.

Thus, the rotor 1 is divided into the rotor pieces 31, 32, 33, 34, 35, 36 respectively having axial lengths of 0.25 L, 0.50 L, 0.23 L, 0.25 L, 0.50 L and 0.25 L, and the skews are continuously defined so that the phase difference of the electric angles thereof is π between the axial sections of the rotor pieces 31, 32, 33 but −π between the axial sections of the rotor pieces 34, 35, 36, and the phase differences of the electric angles are continuous between adjacent surfaces of the rotor pieces 31, and 32, and 33 and 34, and 35 but are π between adjacent surfaces of the rotor pieces 33, 34.

n times (where n is an integer) of the configuration shown in FIG. 13 can also satisfy the orthogonal conditions shown in FIG. 12.

Figure 15:
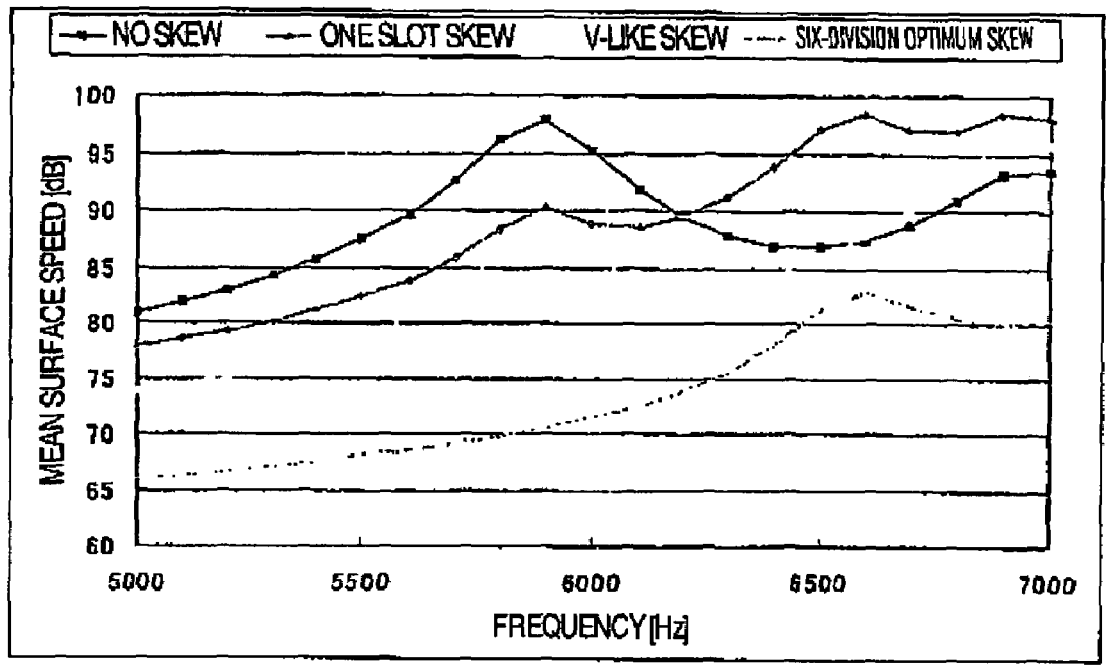
FIG. 15 is a view which shows surface speeds when no skew, one slot skew, λ-like skews and six-division optimum skews are inputted in the model of the rotating electric machine 100.

With the use of the calculation model of the rotating electric machine 100 shown in FIG. 7, a frequency response of mean surface speeds which is obtained when a radial exciting force having a constant amplitude is inputted in the axial direction of an annular O-order by no skew, one slot skew, V-like skews and 6-division optimum skews is shown in FIG. 15.

Figure 16:
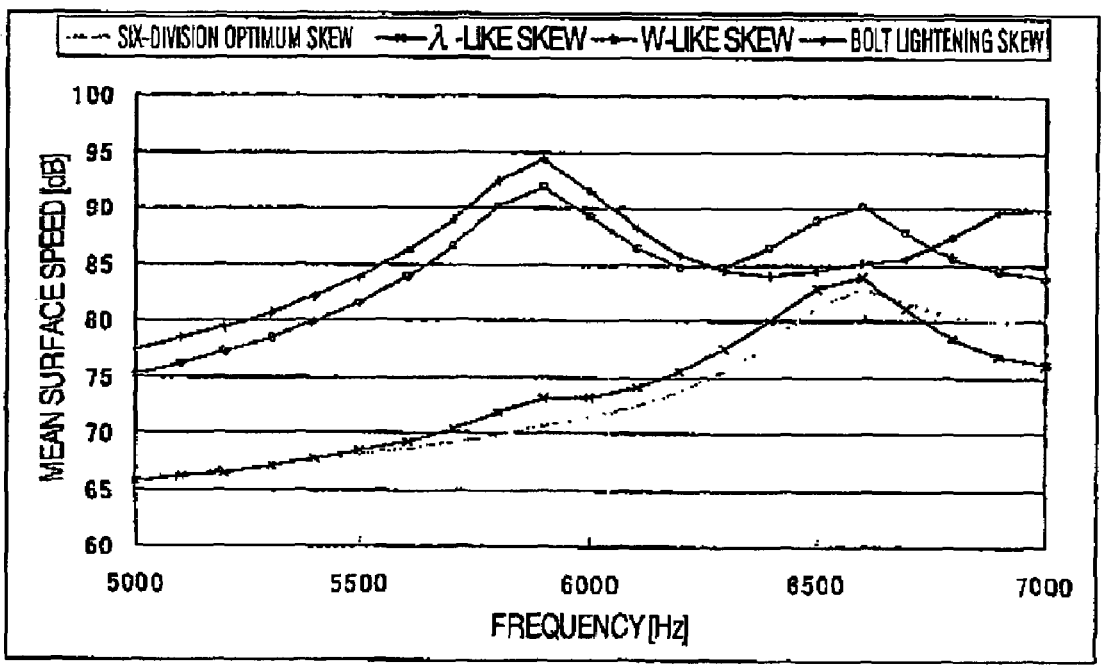
FIG. 16 is a view which shows means surface speeds when six-division optimum skews, W-like skews and bolt lightening skews are inputted in the model of the rotating electric machine 100.

FIG. 16 shows a frequency response of mean surface speeds when a radial exciting force having an annular constant amplitude is inputted in the axial direction of a 0-order by 6-division optimum skew, w-like skews and lightening bolt skews.

Figure 17:
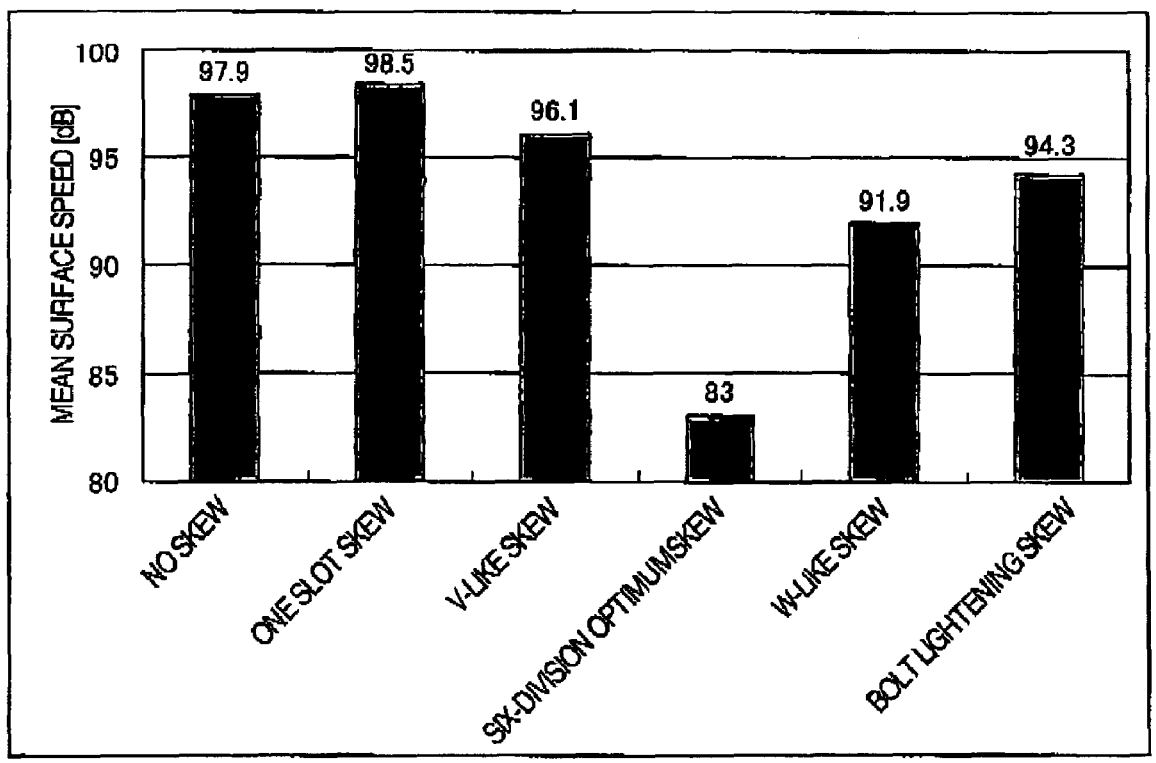
FIG. 17 is a view illustrating maximum values of mean surface speeds when no skew, a one slot skew, V-like skews, six-division optimum skews and W-like skews are inputted in the model of the rotating electric machine 100.

FIG. 17 shows maximum amplitudes of means surface speeds when the various skews are inputted. The mean surface speed at a peak frequency obtained by the six-division optimum skews is lower than those by the other skews, by a value from 8.9 to 15.5 dB, that is, an effect of vibration reduction is exhibited.

Next, consideration will be made of the means surface speeds when the change-over position of the phase is changed by several % of the axial length of the rotor core.

Figure 18:
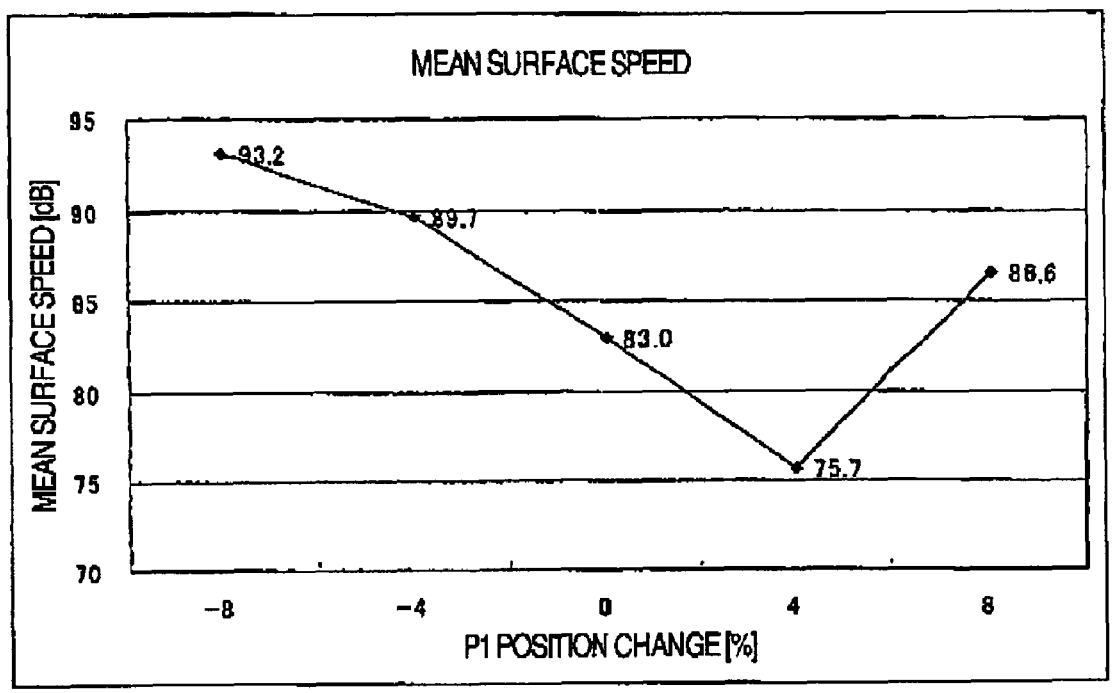
FIG. 18 is a view which shows a result of calculation for a vibration speed by shifting a skew change-over position P1 of the six-division optimum skews.
Figure 19:
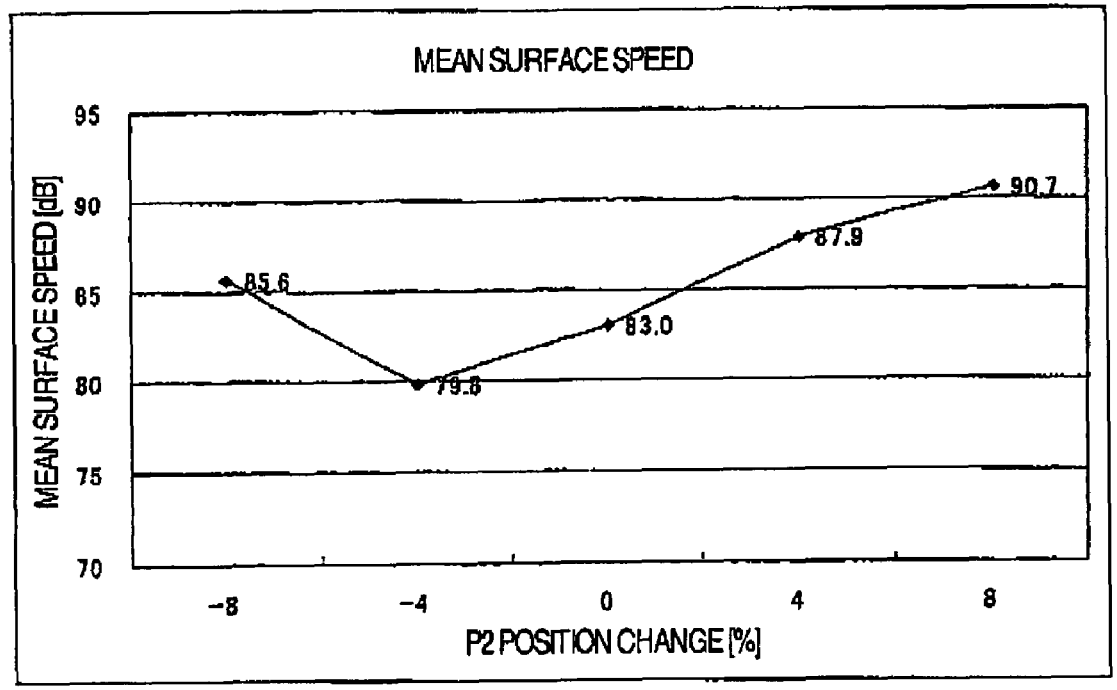
FIG. 19 is a view which shows a result of calculation for vibration speed by shifting a skew change-over position P2 of the six-division optimum skews.
Figure 20:
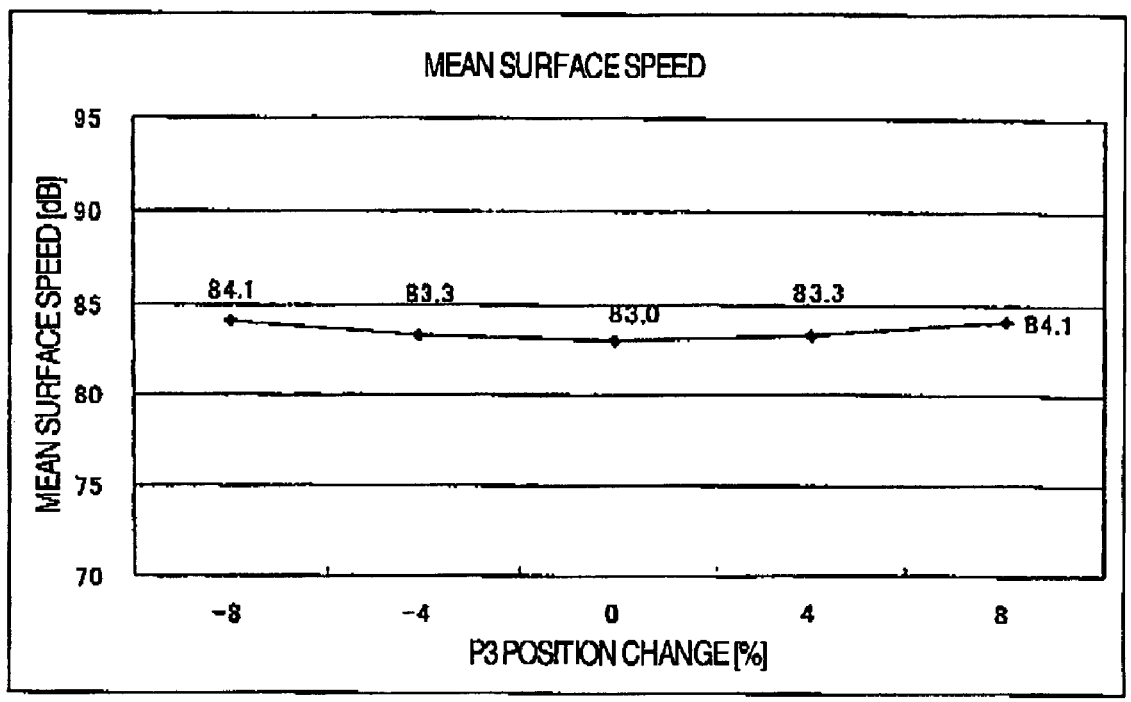
FIG. 20 is a view which shows a result of calculation for vibration speed by shifting a skew change-over position P3 of the six-division optimum skews.

FIG. 18 shows the mean surface speed which varies as the position P1 is changed at a peak frequency, FIG. 19 shows the means surface speed which varies as the position P2 is changed over, and FIG. 20 shows the means surface speed which varies when the position P2 is changed over. As understood from these figures, the variation in the means surface speed is only +/−7.3 dB even though the change-over position is changed by +/−4%, and accordingly, it is possible to obtain an effect of vibration reduction in comparison with other skews. In the case of changing the change-over position by +/−8%, the means surface speed is increased by 10 dB as the position P1 is changed over by −8%, resulting in lowering of the effect of vibration reduction. Even though the rotor pieces 31, 32, 33, 34, 35, 35 are formed in a more or less uneven condition by changing the axial lengths thereof from their ideal values, the six-division optimum skews exhibit the effect of vibration reduction as far as it is based upon such a condition that the axial lengths and the electric angles are optimized.

Embodiment 3

Although explanation has been made of the rotating electric machine itself in the embodiments 1 and 2 as stated above, the configuration incorporated wherein with the rotating electric machine may also exhibit the effect of reduction of vibration and noise.

Figure 21:
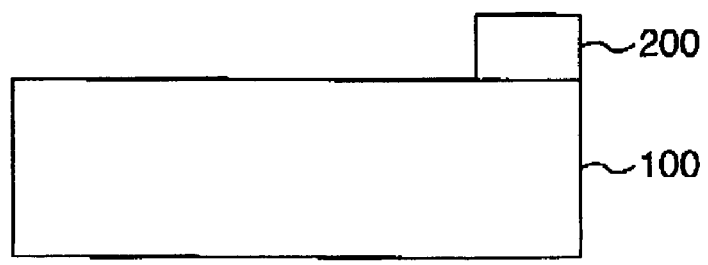
FIG. 21 is a view illustrating a configuration composed of a rotating electric machine according to the present invention and an inverter.
Figure 22:
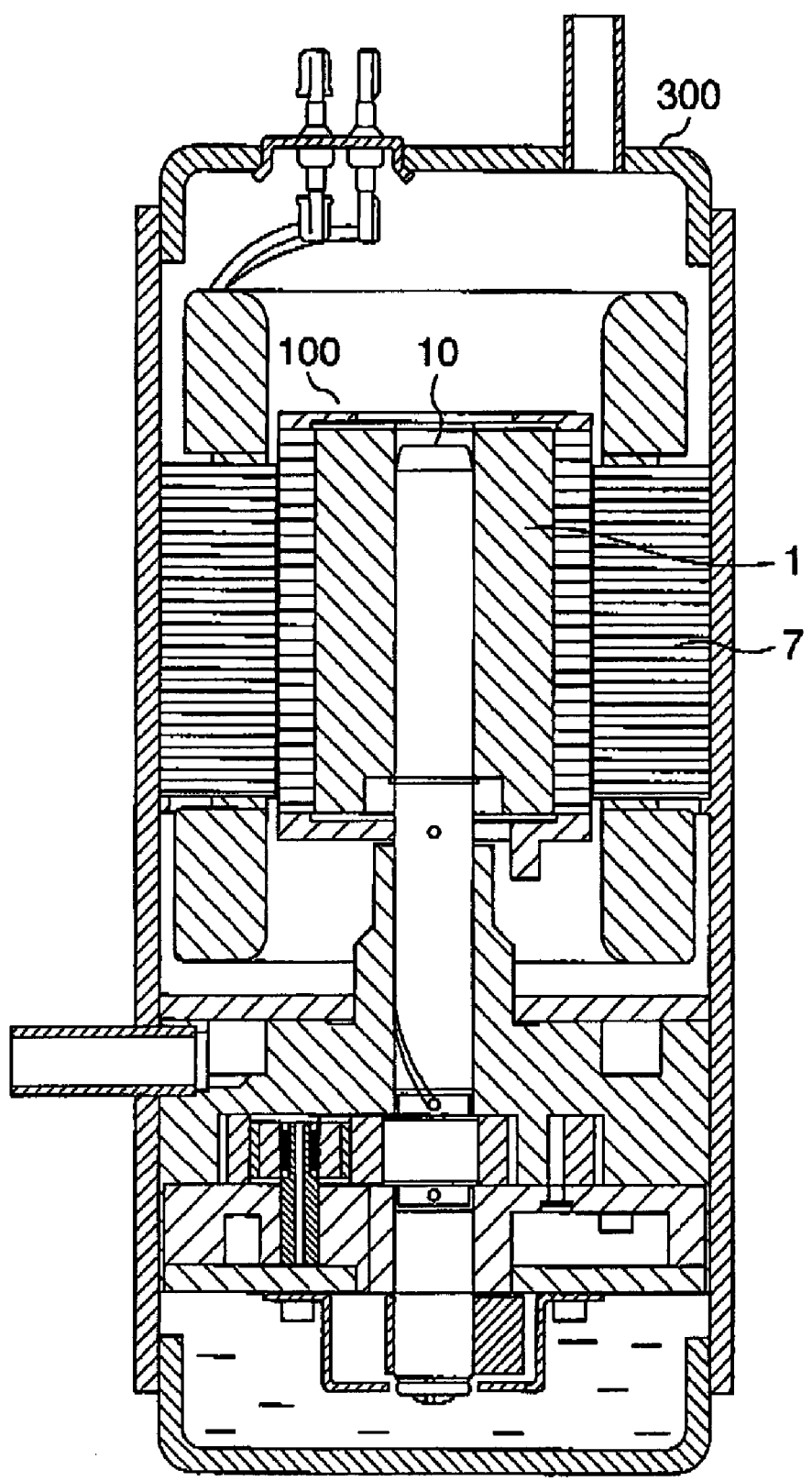
FIG. 22 is a view illustrating an configuration of a compressor incorporating a rotating electric machine according to the present invention.

A configuration shown in FIG. 21 which is a sectional view, is composed of a rotating electric machine 100 and an inverter 200, and a configuration shown in FIG. 22 which is a sectional view is of a compressor incorporated therein the rotating electric machine 100.

Further, as to the configuration of the skews, they have not to be straight but they may be curved if the exciting force pattern and the electromagnetic exciting force satisfy the orthogonal condition as shown in FIG. 2.

Figure 23:
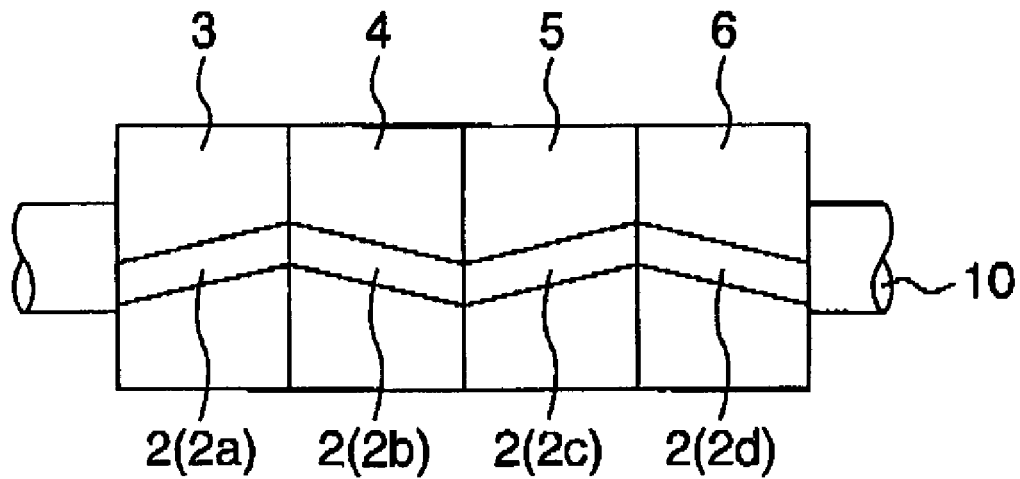
FIG. 23 is a view illustrating a configuration of a rotor having W-like skews.
Figure 24:
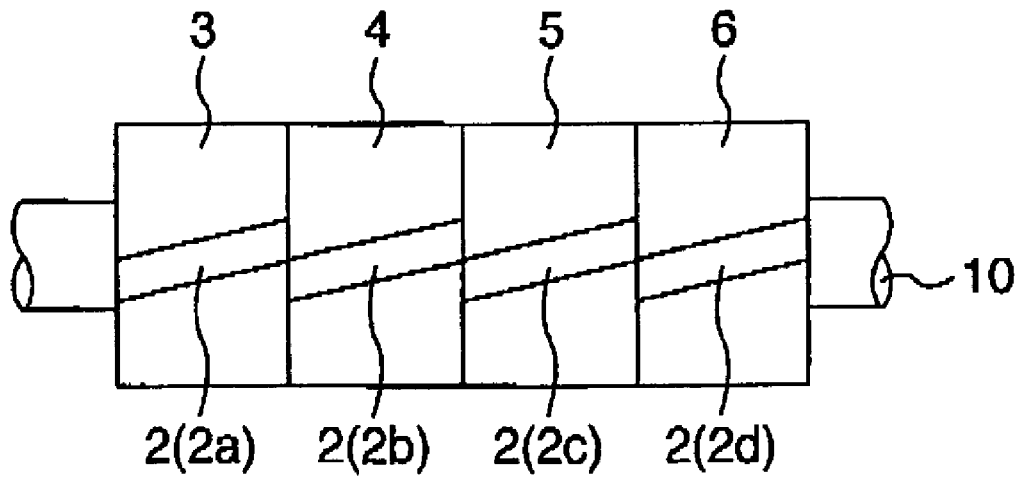
FIG. 24 is a view illustrating a configuration of a rotor having lightening bolt skews.
Figure 25:
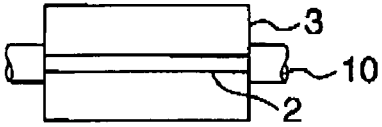
FIG. 25 is a view which shows a list of various skews.
Figure 25:
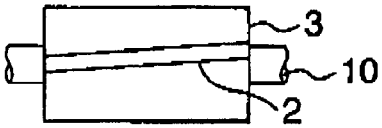
Figure 25:
Figure 25:
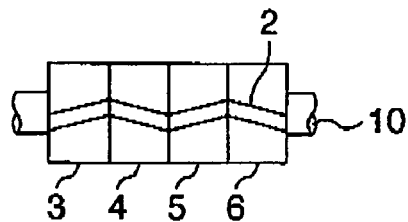
Figure 25:
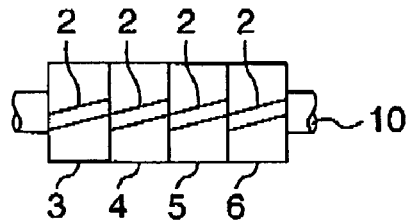
Figure 25:
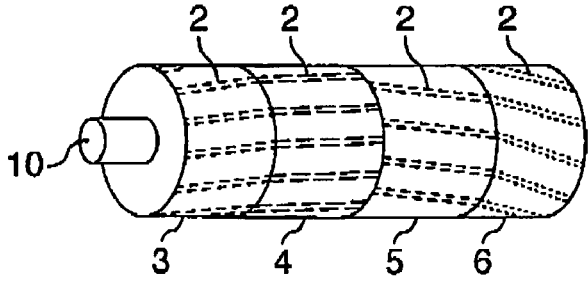
Figure 25:
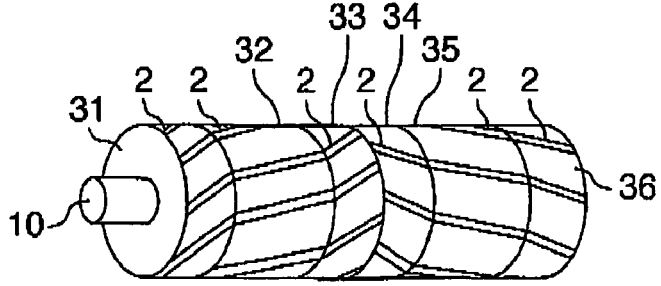

The configuration of the W-like skews is shown in FIG. 23 and the configuration of the bolt lightening skews is shown in FIG. 24, as disclosed in the document 5. FIG. 25 shows a list of several skew configurations.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A rotating electric machine comprising a rotor having effective magnetic pole opening angles for defining a plurality of poles disposed in a torsional position (skew) with respect to a rotor axis and a stator having a plurality of slots, said rotor is axially divided into a plurality of rotor pieces which respectively have different combinations of an axial length and an absolute value of a skew angle, wherein the rotor is divided into four rotor pieces respectively, so as to make axial lengths of the two rotor piece groups to be the same, when defining two continuous rotor pieces in said divided rotor pieces from an axial end of the rotor as a first rotor piece group, and the remaining two continuous rotor pieces as a second rotor piece group, wherein adjacent rotor pieces in said first rotor piece group and said second rotor piece group are bonded with each other, respectively, so as to contact materials constituting an effective magnetic pole opening angle with each other, wherein said first rotor piece group and said second rotor piece group are bonded so as to shift material constituting an effective magnetic pole opening angle of the first rotor piece group and material of the second rotor piece group with each other at a predetermined shifted angle in the rotating direction, and wherein each of said rotor pieces is provided with a skew angle so that phase difference between the electric angles between oppose ends of the four rotor pieces being equal to each other, and said shifted angle in bonding portions between said first rotor piece group and said second rotor piece group is equal to a skew angle between opposite ends of said rotor piece.

2. The rotating electric machine according to claim 1, wherein the rotor pieces respectively have reference lengths of 0.29L, 0.71L, 0.71L and 0.29L, where 2L is an axial length of a rotor core and a sum of axial lengths of said four rotor pieces is 2L, the axial length of the rotor pieces having 0.29L being set to a value which is the reference length 0.29L with a tolerance of −4 to +16% of the axial length of the rotor core while the axial length of the rotor pieces having 0.71L being set to a value which is a reference length 0.71L with a tolerance of +4 to −16% of the axial length of the rotor core.

3. A rotating electric machine comprising a rotor having effective magnetic pole opening angles for defining a plurality of poles disposed in a torsional position (skew) with respect to a rotor axis and a stator having a plurality of slots, said rotor is axially divided into a plurality of rotor pieces which respectively have different combinations of an axial length and an absolute value of a skew angle, wherein the rotor is divided into six rotor pieces respectively, so as to make axial lengths of the three rotor piece groups to be the same, when defining three continuous rotor pieces in said divided rotor pieces from an axial end of the rotor as a first rotor piece group, and the remaining three continuous rotor pieces as a second rotor piece group, wherein adjacent rotor pieces in said first rotor piece group and said second rotor piece group are bonded with each other, respectively, so as to contact materials constituting an effective magnetic pole opening angle with each other, wherein said first rotor piece group and said second rotor piece group are bonded so as to shift material constituting an effective magnetic pole opening angle of the first rotor piece group and material of the second rotor piece group with each other at a predetermined shifted angle in the rotating direction, and wherein each of said rotor pieces is provided with a skew angle so that phase difference between the electric angles between oppose ends of the six rotor pieces being equal to each other, and said shifted angle in bonding portions between said first rotor piece group and said second rotor piece group is equal to a skew angle between opposite ends of said rotor piece.

4. The rotating electric machine according to claim 3, wherein said rotor pieces respectively have axial lengths which are reference lengths of 0.25L, 0.5L, 0.25L, 0.25L, 0.5L and 0.25L, respectively, where 2L is an axial length of a rotor core and a sum of axial lengths of said six rotor pieces is 2L, with a tolerance of +/−4% of the axial length of the rotor core.

* * * * *